(12) United States Patent
Kou et al.

(10) Patent No.: US 9,362,786 B2
(45) Date of Patent: Jun. 7, 2016

(54) POLY-PHASE RELUCTANCE ELECTRIC MOTOR WITH TRANSVERSE MAGNETIC FLUX

(75) Inventors: Baoquan Kou, Harbin (CN); Dagang Xie, Harbin (CN); Taijian Wu, Harbin (CN); Yiheng Zhou, Harbin (CN)

(73) Assignee: Harbin Institute of Technology, Harbin, Heilongjiang Province (CN)

( * ) Notice: Subject to any disclaimer, the term of this patent is extended or adjusted under 35 U.S.C. 154(b) by 322 days.

(21) Appl. No.: 14/129,380

(22) PCT Filed: Jul. 25, 2012

(86) PCT No.: PCT/CN2012/079146
§ 371 (c)(1),
(2), (4) Date: Dec. 26, 2013

(87) PCT Pub. No.: WO2013/026341
PCT Pub. Date: Feb. 28, 2013

(65) Prior Publication Data
US 2014/0125157 A1    May 8, 2014

(30) Foreign Application Priority Data
Aug. 25, 2011   (CN) .......................... 2011 1 0247005

(51) Int. Cl.
*H02K 21/12*   (2006.01)
*H02K 1/17*    (2006.01)
*H02K 21/44*   (2006.01)

(52) U.S. Cl.
CPC .................. *H02K 1/17* (2013.01); *H02K 21/44* (2013.01); *H02K 2201/12* (2013.01)

(58) Field of Classification Search
CPC ...... H02K 1/17; H02K 2201/12; H02K 21/44; H02K 21/046; H02K 1/2706; H02K 1/27; H02K 21/12; H02K 21/16; H02K 21/145; H02K 21/185; H02K 16/00
USPC .......... 310/49.28, 49.36, 49.37, 49.43, 49.44, 310/49.46, 181, 106, 156.02, 49.39, 310/216.023
See application file for complete search history.

(56) References Cited

U.S. PATENT DOCUMENTS

2009/0206686 A1* 8/2009 Vollmer ................. H02K 16/04
310/49.46

* cited by examiner

*Primary Examiner* — Joshua Benitez-Rosario
*Assistant Examiner* — Alexander Moraza
(74) *Attorney, Agent, or Firm* — Novoclaims Patent Services LLC; Mei Lin Wong

(57) ABSTRACT

A multi-phase reluctance electric motor with transverse magnetic flux which includes a stator and a rotor. The stator comprises a housing (1) and a number m of phase armature units, each being staggered at an electrical angle of 360°/m along the circumferential direction sequentially in the housing (1) along the axial direction and comprises an armature iron core, an armature coil (2) and permanent magnets (3). The armature coil (2) is embedded within an annular space formed among first, second and third annular iron core segments (6, 7, 8) of the armature iron core. The pole distance τm between two adjacent permanent magnets (3) on the same segment and the tooth distance τp between the rotor teeth (5) along the circumferential direction fulfil 2τm=τp. This motor eliminates mutual inductance between phases, improving control precision of current and electromagnetic torque and dynamic characteristics of the system.

20 Claims, 11 Drawing Sheets

POLY-PHASE RELUCTANCE ELECTRIC MOTOR WITH TRANSVERSE MAGNETIC FLUX

BACKGROUND OF THE PRESENT INVENTION

1. Field of Invention

The present invention relates to a reluctance motor, and more particularly to a poly-phase reluctance motor.

2. Description of Related Arts

A conventional multi-phase permanent magnet synchronous motor is disclosed in FIG. 1 of the drawings of which the armature winding is a distributed winding which requires a large number of coils to build the winding, the end wires of each winding intersect with each other, the end wires are long and the copper loss is great, and the insulation of the winding is complex and the manufacturing cost is high. Because there exists magnetic coupling between separate phases, the mutual inductance will adversely affect the precision on current control. On the other hand, the magnetic flux generated by the winding in each phase will pass through a relative long flux path, therefore the stator iron loss is relatively great and further increase of motor efficiency is restricted. Also, the permanent magnet is positioned on the stator and the structural strength and allowable temperature rise of the stator are restricted, hence the application of electric motor is limited.

SUMMARY OF THE PRESENT INVENTION

An object of the present invention is to provide a poly-phase reluctance electric motor with transverse magnetic flux in order to solve the problem of conventional multi-phase permanent magnet synchronous motor in which the precision level in current control which is adversely affected by the existence of magnetic coupling between different phases.

Solution

Technical Solution

According to the present invention, the foregoing and other objects and advantages are attained by a multi-phase reluctance electric motor with transverse magnetic flux, comprising: a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein the armature iron core comprises a first iron core segment 6, a second iron core segment 7 and a third iron core segment 8 in which all of the first, second and third iron core segments have a ring-shaped structure defining an axial direction, a central axis along the axial direction, an outer diameter and an inner diameter respectively, wherein the outer diameter of each of the first, the second and the third iron core segments is the same; wherein the first, the second and the third iron core segments are sequentially and tightly arranged along the axial direction inside the housing 1, and the central axis of the first, the second and the third iron core segments is the same; wherein the second iron core segment 7 is positioned between the first iron core segment 6 and the third iron core segment 8 and the inner diameter of the second iron core segment 7 is greater than that of the first iron core segment 6 and the inner diameter of the third iron core segment 8; wherein the inner diameter of the first iron core segment 6 and the inner diameter of the third iron core segment 8 are the same; wherein the armature coil 2 has an annular coil structure and the armature coil 2 is embedded within an annular space formed between the first iron core segment, the second iron core segment and the third iron core segments; wherein the 2n number of permanent magnets 3 utilizes permanent magnet having a tile-shaped structure which is radially magnetized or magnetized in parallel; wherein the 2n number of permanent magnets 3 are divided equally into 2 groups to define a first permanent magnet group and a second permanent magnet group; wherein the permanent magnets of the first permanent magnet group are sequentially and alternately aligned according to a N-pole and a S-pole of each of the permanent magnets along a circumferential direction at an inner surface of the first segment 6; wherein the permanent magnets 3 of the second permanent magnet group are sequentially and alternately aligned according to a S-pole and a N-pole of each of the permanent magnets 3 along a circumferential direction at an inner surface of the third segment 8; wherein the permanent magnets 3 in the first segment 6 and the permanent magnets in the third segment 8 are arranged in opposite polarities and symmetrically along the axis of symmetry of the cross-section of the second segment 7; wherein a polar distance $\tau_m$ is defined as a distance between each two adjacently positioned permanent magnets in the same iron core segment in which the permanent magnets are aligned along the circumferential direction of the corresponding iron core segment, where a pitch $\tau_p$ of the rotor teeth (5) is defined as a distance between two tooth which are aligned along the circumferential direction, and a relation between the polar distance and the pitch fulfills the equation $2\tau_m = \tau_p$.

The multi-phase reluctance electric motor with transverse magnetic flux according to another preferred embodiment of the present invention comprises a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein the armature iron core comprises a first iron core segment 6, a second iron core segment 7 and a third iron core segment 8 in which all of the first, second and third iron core segments have a ring-shaped structure defining an axial direction, a central axis along the axial direction, an outer diameter and an inner diameter respectively, wherein the outer diameter of each of the first, the second and the third iron core segments is the same; wherein the first, the second and the third iron core segments are sequentially and tightly arranged along the axial direction inside the housing 1, and the central axis of the first, the second and the third iron core segments is the same; wherein the second iron core segment 7 is positioned between the first iron core segment 6 and the third iron core segment 8 and the inner diameter of the second iron core segment 7 is greater than that of the first iron core segment 6 and the inner diameter of the third iron core segment 8; wherein the inner diameter of the first iron core segment 6 and the inner diameter of the third iron core segment 8 are the same; wherein the armature coil 2 has an annular coil structure and the armature coil 2 is embedded within an annular space formed between the first iron core segment, the second iron core segment and the third iron core segments; wherein a plurality of axial slots for permanent magnet are uniformly provided along the circumferential direction at an inner circumferential surface of the first iron core segment 6 and at an inner circumferential surface of the third iron core segment 8 respectively; wherein a number of the axial slots in the first iron core segment 6 is the same as a number of the axial slots in the third iron core segment 8; wherein the 2n number of permanent magnets 3 utilizes permanent magnet having a tile-shaped structure which is radially magnetized or magnetized in parallel; wherein the 2n number of permanent magnets 3 are divided equally into 2 groups to define a first permanent magnet group and a second permanent magnet group; wherein each of the permanent magnets of the first permanent magnet group are secured into position at one of the axial slot of the first iron core segment 6; wherein each of the permanent magnets of the second permanent magnet group are secured into position at one of the axial slots of the third iron core segment 8; wherein a magnetization direction of each of the permanent magnets which is positioned in the first iron core segment 6 is the same, and the magnetization direction of the permanent magnets in the first iron core segment 6 is pointing to or away from the center; wherein a magnetization direction of each of the plurality of permanent magnets in the third iron core segment 8 is the same, and the magnetization direction of the permanent magnets in the third iron core segment 8 is pointing to or away from the center; wherein the permanent magnets in the first iron core segment 6 and the permanent magnets in the third iron core segment 8 are arranged in opposite polarities and symmetrically along the axis of symmetry of the cross-section of the second iron core segment 7; wherein a polar distance $\tau_m$ is defined as a distance between each two adjacently positioned permanent magnets in the same iron core segment in which the permanent magnets are aligned along the circumferential direction of the corresponding iron core segment, where a pitch $\tau_p$ of the rotor teeth (5) is defined as a distance between two tooth which are aligned along the circumferential direction, and a relation between the polar distance and the pitch fulfills the equation $\tau_m = \tau_p$.

The multi-phase reluctance electric motor with transverse magnetic flux according to another preferred embodiment of the present invention comprises a stator 10 and a rotor 20; wherein a gas partition channel 30 is defined between the stator and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein the armature iron core comprises a first iron core segment 6, a second iron core segment 7 and a third iron core segment 8 in which all of the first, second and third iron core segments have a ring-shaped structure defining an axial direction, a central axis along the axial direction, an outer diameter and an inner diameter respectively, wherein the outer diameter of each of the first, the second and the third iron core segments is the same; wherein the first, the second and the third iron core segments are sequentially and tightly arranged along the axial direction inside the housing 1, and the central axis of the first, the second and the third iron core segments is the same; wherein the second iron core segment 7 is positioned between the first iron core segment 6 and the third iron core segment 8 and the inner diameter of the second iron core segment 7 is greater than that of the first iron core segment 6 and the inner diameter of the third iron core segment 8; wherein the inner diameter of the first iron core segment 6 and the inner diameter of the third iron core segment 8 are the same; wherein the armature coil 2 has an annular coil structure and the armature coil 2 is embedded within an annular space formed between the first iron core segment, the second iron core segment and the third iron core segments; wherein a plurality of axial slots for permanent magnet are uniformly provided along the circumferential direction at an inner circumferential surface of the first iron core segment 6 and at an inner circumferential surface of the third iron core segment 8 respectively; wherein a number of the axial slots in the first iron core segment 6 is the same as a number of the axial slots in the third iron core segment 8; wherein a rotation difference of positions between the axial slots of the first iron core segment 6 and the axial slots of the third iron core segment 8 along the circumferential direction is equal to half of a pitch $\tau_p/2$, where a pitch $\tau_p$ of the rotor teeth 5 is defined as a distance between two tooth which are aligned along the circumferential direction; wherein the 2n number of permanent magnets 3 utilizes permanent magnet having a tile-shaped structure which is radially magnetized or magnetized in parallel; wherein the 2n number of permanent magnets 3 are divided equally into 2 groups to define a first permanent magnet group and a second permanent magnet group; wherein each of the permanent magnets of the first permanent magnet group are secured into position at one of the axial slot of the first iron core segment 6; wherein each of the permanent magnets of the second permanent magnet group are secured into position at one of the axial slots of the third iron core segment 8; wherein a magnetization direction of each of the permanent magnets which is positioned in the first iron core segment 6 is the same, and the magnetization direction of the permanent magnets in the first iron core segment 6 is pointing to or away from the center; wherein a magnetization direction of each of the plurality of permanent magnets in the third iron core segment 8 is the same, and the magnetization direction of the permanent magnets in the third iron core segment 8 is pointing to or away from the center; wherein the permanent magnets in the first iron core segment 6 and the permanent magnets in the third iron core segment 8 are arranged in the same polarities; wherein a polar distance $\tau_m$ is defined as a distance between each two adjacently positioned permanent magnets in the same iron core segment in which the permanent magnets are aligned along the circumferential direction of the corresponding iron core segment, and a relation between the polar distance and the pitch fulfills the equation $\tau_m = \tau_p$.

The multi-phase reluctance electric motor with transverse magnetic flux according to another preferred embodiment of the present invention comprises a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein each of the armature iron cores comprises n number of iron core poles and each one of the iron core poles comprises one first iron core segment 6, one second iron core segment 7 and one third iron core segment 8 fittingly arranged together, while n number of axial slots are uniformly provided along the circumferential direction at an inner surface of the housing 1 and each of the axial slots has a bottom portion having an arc-shaped structure and two side panels which are parallel to each other; wherein the number of axial slots is the same as the number of iron core poles of the armature iron core in the same armature iron core, the n number of iron core poles of each of the armature iron core are sequentially positioned in the axial slots along the circumferential direction respectively, and each of the iron core pole are fittingly in direct contact with the bottom portion and the two side panels of the axial slot corresponding to the particular iron core pole; wherein a height of the first iron core segment 6 along a radial direction is the same as a height of the third iron core segment 8 along the radial direction, a height of the second iron core segment 7 along the radial direction is smaller than the height of the first iron core segment 6 along the radial direction, each of the iron core poles define one gas partition side panel adjacent to the gas partition channel 30 and has one winding groove provided on the gas partition side panel, and all of the winding grooves of the n number of iron core poles of the same armature iron core have the same axial position; wherein the armature coil 2 is an annular armature coil and the armature coil 2 is embedded in the winding grooves of the n number of iron core poles of the armature iron core corresponding to the same armature iron core; wherein the 2n number of permanent magnets 3 utilizes radially magnetized or magnetized in parallel tile-shaped permanent magnets; wherein the 2n number of permanent magnets 3 are positioned at an inner surface of the first iron core segment 6 and at an inner surface of the third iron core segment 8 of the n number of iron core poles respectively; wherein each of the two adjacently positioned permanent magnets 3 belonging to the same particular iron core pole are arranged in opposite polarities and each of the two adjacently positioned permanent magnets 3 along the circumferential direction are also arranged in opposite polarities; wherein a polar distance $\tau_m$ is defined as a distance between the two adjacently positioned permanent magnets aligned along the circumferential direction, where a pitch $\tau_p$ is defined as a distance between two tooth of the rotor teeth 5 which are aligned along the circumferential direction, and a relation between the polar distance and the pitch fulfills the equation $2\tau_m = \tau_p$.

The multi-phase reluctance electric motor with transverse magnetic flux according to another preferred embodiment of the present invention comprises a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is an even number; wherein the armature iron core comprises a first iron core segment 6, a second iron core segment 7 and a third iron core segment 8, all of the first, the second and the third iron core segments have a ring-shaped structure, each of which defines a central axis, an outer diameter and an inner diameter respectively, the first, the second and the third iron core segments are sequentially and tightly arranged along an axial direction inside the housing 1, the central axis of the first, the second and the third iron core segments is the same, the outer diameter of the first, the second and the third segments is the same, the second iron core segment 7 is positioned between the first iron core segment 6 and the third iron core segment 8, the inner diameter of the second iron core segment 7 is greater than the inner diameter of the first iron core segment 7, and the inner diameter of the first iron core segment 6 and the inner diameter of the third iron core segment 8 are the same; wherein the armature coil 2 is an annular armature coil and the armature coil 2 is embedded within an annular space formed between the first iron core segment 6, the second iron core segment 7 and the third iron core segment 8; wherein each of the 2n number of permanent magnets 3 has a flat-shaped structure and is tangentially magnetized; wherein the 2n number of permanent magnets 3 are divided equally into 2 groups to define a first permanent magnet group and a second permanent magnet group; wherein the n number of permanent magnets 3 of the first permanent magnet group are uniformly embedded inside the first iron core segment 6 of the armature iron core along the circumferential direction and are aligned to forming a first radial alignment pattern along the radial direction; wherein the n number of permanent magnets 3 of the second permanent magnet group are uniformly embedded inside the third iron core segment 8 of the armature iron core along the circumferential direction and are aligned to forming a second radial alignment pattern along the radial direction, while each of the permanent magnets 3 are fittingly in direct contact with the housing 1; wherein a length of each of the permanent magnets 3 of the first iron core segment 6 and a length of each of the permanent magnets 3 of the third iron core segment 8 along the axial direction is the same; the first iron core segment 6 embedded with the permanent magnets 3 and the third iron core segment 8 embedded with the permanent magnets 3 have the same structural construction in which each of the two adjacently positioned permanent magnets 3 along the circumferential direction are arranged in opposite polarities and each of the two adjacently positioned permanent magnets 3 along the axial direction are arranged in opposite polarities; wherein a polar distance $\tau_m$ is defined as a distance between the two adjacently positioned permanent magnets aligned along the circumferential direction, where a pitch $\tau_p$ is defined as a distance between two tooth of the rotor teeth 5 which are aligned along the circumferential direction, and a relation between the polar distance and the pitch fulfills the equation $2\tau_m = \tau_p$.

The multi-phase reluctance electric motor with transverse magnetic flux according to another preferred embodiment of the present invention comprises a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and a plurality number of permanent magnets 3; wherein each of the armature iron cores comprises a plurality number of iron core poles in which each one of the iron core poles comprises one first iron core segment 6, one second iron core segment 7 and one third iron core segment 8 fittingly arranged together, while a plurality number of axial slots which have the same structural construction are uniformly provided along the circumferential direction at an inner surface of the housing 1 and are aligned to form a radial pattern along the radial direction, and each of the axial slots has a bottom portion having an arc-shaped structure and two side panels extended from two sides of the bottom portion; wherein the number of axial slots is the same as the number of iron core poles of the armature iron core belonging to the same armature iron core; wherein each of the iron core poles of each one of the armature iron core is fittingly positioned in one of the axial slots, and each of the iron core poles is fittingly in direct contact with the bottom portion and the two side panels of the axial slot receiving the particular iron core pole; wherein the second iron core segment 7 is positioned between the first iron core segment 6 and the third iron core segment 8, a height of the first iron core segment 6 along the radial direction is the same as a height of the third iron core segment 8 along the radial direction, a height of the second iron core segment 7 along the radial direction is smaller than the height of the first iron core segment 6 along the radial direction, each of the iron core poles defines one gas partition side panel adjacent to the gas partition channel 30 and has one winding groove provided on the gas partition side panel, and all of the winding grooves of each of the iron core poles of the same armature iron core has the same axial position; wherein the armature coil 2 is an annular armature coil and the armature coil 2 is embedded in the winding grooves of the iron core poles of the armature iron core corresponding to the same armature iron core; wherein each of the plurality number of permanent magnets 3 has a flat-shaped structure and is tangentially magnetized; wherein along the circumferential direction, one piece of permanent magnet 3 is embedded into the center of the first iron core segment 6 of each of the iron core pole, and one piece of permanent magnet 3 is embedded into the center of the third iron core segment 8 of each of the iron core pole; wherein each of the two adjacently positioned permanent magnets 3 along the circumferential direction are arranged in opposite polarities and each of the two adjacently positioned permanent magnets 3 along the axial direction are arranged in opposite polarities; wherein a polar distance $\tau_m$ is defined as a distance between the two adjacently positioned permanent magnets aligned along the circumferential direction, where a pitch $\tau_p$ is defined as a distance between two tooth of the rotor teeth 5 which are aligned along the circumferential direction, and a relation between the polar distance and the pitch fulfills the equation $2\tau_m = \tau_p$.

According to the multi-phase reluctance electric motor with transverse magnetic flux of the present invention, the multi-phase reluctance electric motor with transverse magnetic flux comprises: a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein the armature iron core comprises a first iron core segment 6, a second iron core segment 7 and a third iron core segment 8 in which all of the first, second and third iron core segments have a ring-shaped structure defining an axial direction, a central axis along the axial direction, an outer diameter and an inner diameter respectively, wherein the outer diameter of each of the first, the second and the third iron core segments is the same; wherein the first, the second and the third iron core segments are sequentially and tightly arranged along the axial direction inside the housing 1, and the central axis of the first, the second and the third iron core segments is the same; wherein the second iron core segment 7 is positioned between the first iron core segment 6 and the third iron core segment 8 and the inner diameter of the second iron core segment 7 is greater than that of the first iron core segment 6 and the inner diameter of the third iron core segment 8; wherein the inner diameter of the first iron core segment 6 and the inner diameter of the third iron core segment 8 are the same; wherein the armature coil 2 has an annular coil structure and the armature coil 2 is embedded within an annular space formed between the first iron core segment, the second iron core segment and the third iron core segments; wherein the 2n number of permanent magnets 3 utilizes permanent magnets, each having a tile-shaped structure which is radially magnetized or magnetized in parallel; wherein the 2n number of permanent magnets 3 are divided equally into 2 groups to define a first permanent magnet group and a second permanent magnet group; wherein the permanent magnets of the first permanent magnet group are sequentially and alternately aligned according to a N-pole and a S-pole of each of the permanent magnets along a circumferential direction at an inner surface of the first segment 6; wherein the permanent magnets 3 of the second permanent magnet group are sequentially and alternately aligned according to a S-pole and a N-pole of each of the permanent magnets 3 along a circumferential direction at an inner surface of the third segment 8; wherein the permanent magnets 3 in the first segment 6 and the permanent magnets in the third segment 8 are arranged in opposite polarities and symmetrically along the axis of symmetry of the cross-section of the second segment 7; wherein a polar distance $\tau_m$ is defined as a distance between each two adjacently positioned permanent magnets in the same iron core segment in which the permanent magnets are aligned along the circumferential direction of the corresponding iron core segment, where a pitch $\tau_p$ of the rotor teeth 5 is defined as a distance between two tooth which are aligned along the circumferential direction, and a relation between the polar distance and the pitch fulfills the equation $2\tau_m = \tau_p$.

According to the multi-phase reluctance electric motor with transverse magnetic flux of the present invention, the multi-phase reluctance electric motor with transverse magnetic flux comprises: a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein the armature iron core comprises a first iron core segment 6, a second iron core segment 7 and a third iron core segment 8 in which all of the first, second and third iron core segments have a ring-shaped structure defining an axial direction, a central axis along the axial direction, an outer diameter and an inner diameter respectively, wherein the outer diameter of each of the first, the second and the third iron core segments is the same; wherein the first, the second and the third iron core segments are sequentially and tightly arranged along the axial direction inside the housing 1, and the central axis of the first, the second and the third iron core segments is the same; wherein the second iron core segment 7 is positioned between the first iron core segment 6 and the third iron core segment 8 and the inner diameter of the second iron core segment 7 is greater than that of the first iron core segment 6 and the inner diameter of the third iron core segment 8; wherein the inner diameter of the first iron core segment 6 and the inner diameter of the third iron core segment 8 are the same; wherein the armature coil 2 has an annular coil structure and the armature coil 2 is embedded within an annular space formed between the first iron core segment, the second iron core segment and the third iron core segments; wherein a plurality of axial slots for permanent magnet are uniformly provided along the circumferential direction at an inner circumferential surface of the first iron core segment 6 and at an inner circumferential surface of the third iron core segment 8 respectively; wherein a number of the axial slots in the first iron core segment 6 is the same as a number of the axial slots in the third iron core segment 8; wherein the 2n number of permanent magnets 3 utilizes permanent magnets, each having a tile-shaped structure which is radially magnetized or magnetized in parallel; wherein the 2n number of permanent magnets 3 are divided equally into 2 groups to define a first permanent magnet group and a second permanent magnet group; wherein each of the permanent magnets of the first permanent magnet group are secured into position at one of the axial slot of the first iron core segment 6; wherein each of the permanent magnets of the second permanent magnet group are secured into position at one of the axial slots of the third iron core segment 8; wherein a magnetization direction of each of the permanent magnets which is positioned in the first iron core segment 6 is the same, and the magnetization direction of the permanent magnets in the first iron core segment 6 is pointing to or away from the center; wherein a magnetization direction of each of the plurality of permanent magnets in the third iron core segment 8 is the same, and the magnetization direction of the permanent magnets in the third iron core segment 8 is pointing to or away from the center; wherein the permanent magnets in the first iron core segment 6 and the permanent magnets in the third iron core segment 8 are arranged in opposite polarities and symmetrically along the axis of symmetry of the cross-section of the second iron core segment 7; wherein a polar distance $\tau_m$ is defined as a distance between each two adjacently positioned permanent magnets in the same iron core segment in which the permanent magnets are aligned along the circumferential direction of the corresponding iron core segment, where a pitch $\tau_p$ of the rotor teeth 5 is defined as a distance between two tooth which are aligned along the circumferential direction, and a relation between the polar distance and the pitch fulfills the equation $\tau_m = \tau_p$.

According to the multi-phase reluctance electric motor with transverse magnetic flux of the present invention, the multi-phase reluctance electric motor with transverse magnetic flux comprises: a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein the armature iron core comprises a first iron core segment 6, a second iron core segment 7 and a third iron core segment 8 in which all of the first, second and third iron core segments have a ring-shaped structure defining an axial direction, a central axis along the axial direction, an outer diameter and an inner diameter respectively, wherein the outer diameter of each of the first, the second and the third iron core segments is the same; wherein the first, the second and the third iron core segments are sequentially and tightly arranged along the axial direction inside the housing 1, and the central axis of the first, the second and the third iron core segments is the same; wherein the second iron core segment 7 is positioned between the first iron core segment 6 and the third iron core segment 8 and the inner diameter of the second iron core segment 7 is greater than that of the first iron core segment 6 and the inner diameter of the third iron core segment 8; wherein the inner diameter of the first iron core segment 6 and the inner diameter of the third iron core segment 8 are the same; wherein the armature coil 2 has an annular coil structure and the armature coil 2 is embedded within an annular space formed between the first iron core segment, the second iron core segment and the third iron core segments; wherein a plurality of axial slots for permanent magnet are uniformly provided along the circumferential direction at an inner circumferential surface of the first iron core segment 6 and at an inner circumferential surface of the third iron core segment 8 respectively; wherein a number of the axial slots in the first iron core segment 6 is the same as a number of the axial slots in the third iron core segment 8; wherein a rotation difference of positions between the axial slots of the first iron core segment 6 and the axial slots of the third iron core segment 8 along the circumferential direction is equal to half of a pitch $\tau_p/2$, where a pitch $\tau_p$ of the rotor teeth 5 is defined as a distance between two tooth which are aligned along the circumferential direction; wherein the 2n number of permanent magnets 3 utilizes permanent magnets, each having a tile-shaped structure which is radially magnetized or magnetized in parallel; wherein the 2n number of permanent magnets 3 are divided equally into 2 groups to define a first permanent magnet group and a second permanent magnet group; wherein each of the permanent magnets of the first permanent magnet group are secured into position at one of the axial slot of the first iron core segment 6; wherein each of the permanent magnets of the second permanent magnet group are secured into position at one of the axial slots of the third iron core segment 8; wherein a magnetization direction of each of the permanent magnets which is positioned in the first iron core segment 6 is the same, and the magnetization direction of the permanent magnets in the first iron core segment 6 is pointing to or away from the center; wherein a magnetization direction of each of the plurality of permanent magnets in the third iron core segment 8 is the same, and the magnetization direction of the permanent magnets in the third iron core segment 8 is pointing to or away from the center; wherein the permanent magnets in the first iron core segment 6 and the permanent magnets in the third iron core segment 8 are arranged in the same polarities; wherein a polar distance $\tau_m$ is defined as a distance between each two adjacently positioned permanent magnets in the same iron core segment in which the permanent magnets are aligned along the circumferential direction of the corresponding iron core segment, and a relation between the polar distance and the pitch fulfills the equation $\tau_m = \tau_p$.

According to the multi-phase reluctance electric motor with transverse magnetic flux of the present invention, the multi-phase reluctance electric motor with transverse magnetic flux comprises: a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein each of the armature iron cores comprises n number of iron core poles and each one of the iron core poles comprises one first iron core segment 6, one second iron core segment 7 and one third iron core segment 8 fittingly arranged together, while n number of axial slots are uniformly provided along the circumferential direction at an inner surface of the housing 1 and each of the axial slots has a bottom portion having an arc-shaped structure and two side panels which are parallel to each other; wherein the number of axial slots is the same as the number of iron core poles of the armature iron core in the same armature iron core, the n number of iron core poles of each of the armature iron core are sequentially positioned in the axial slots along the circumferential direction respectively, and each of the iron core pole are fittingly in direct contact with the bottom portion and the two side panels of the axial slot corresponding to the particular iron core pole; wherein a height of the first iron core segment 6 along a radial direction is the same as a height of the third iron core segment 8 along the radial direction, a height of the second iron core segment 7 along the radial direction is smaller than the height of the first iron core segment 6 along the radial direction, each of the iron core poles define one gas partition side panel adjacent to the gas partition channel 30 and has one winding groove provided on the gas partition side panel, and all of the winding grooves of the n number of iron core poles of the same armature iron core have the same axial position; wherein the armature coil 2 is an annular armature coil and the armature coil 2 is embedded in the winding grooves of the n number of iron core poles of the armature iron core corresponding to the same armature iron core; wherein the 2n number of permanent magnets 3 utilizes radially magnetized or magnetized in parallel tile-shaped permanent magnets; wherein the 2n number of permanent magnets 3 are positioned at an inner surface of the first iron core segment 6 and at an inner surface of the third iron core segment 8 of the n number of iron core poles respectively; wherein each of the two adjacently positioned permanent magnets 3 belonging to the same particular iron core pole are arranged in opposite polarities and each of the two adjacently positioned permanent magnets 3 along the circumferential direction are also arranged in opposite polarities; wherein a polar distance $\tau_m$ is defined as a distance between the two adjacently positioned permanent magnets aligned along the circumferential direction, where a pitch $\tau_p$ is defined as a distance between two tooth of the rotor teeth 5 which are aligned along the circumferential direction, and a relation between the polar distance and the pitch fulfills the equation $2\tau_m = \tau_p$.

According to the multi-phase reluctance electric motor with transverse magnetic flux of the present invention, the multi-phase reluctance electric motor with transverse magnetic flux comprises: a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is an even number; wherein the armature iron core comprises a first iron core segment 6, a second iron core segment 7 and a third iron core segment 8, all of the first, the second and the third iron core segments have a ring-shaped structure, each of which defines a central axis, an outer diameter and an inner diameter respectively, the first, the second and the third iron core segments are sequentially and tightly arranged along an axial direction inside the housing 1, the central axis of the first, the second and the third iron core segments is the same, the outer diameter of the first, the second and the third segments is the same, the second iron core segment 7 is positioned between the first iron core segment 6 and the third iron core segment 8, the inner diameter of the second iron core segment 7 is greater than the inner diameter of the first iron core segment 7, and the inner diameter of the first iron core segment 6 and the inner diameter of the third iron core segment 8 are the same; wherein the armature coil 2 is an annular armature coil and the armature coil 2 is embedded within an annular space formed between the first iron core segment 6, the second iron core segment 7 and the third iron core segment 8; wherein each of the 2n number of permanent magnets 3 has a flat-shaped structure and is tangentially magnetized; wherein the 2n number of permanent magnets 3 are divided equally into 2 groups to define a first permanent magnet group and a second permanent magnet group; wherein the n number of permanent magnets 3 of the first permanent magnet group are uniformly embedded inside the first iron core segment 6 of the armature iron core along the circumferential direction and are aligned to forming a first radial alignment pattern along the radial direction; wherein the n number of permanent magnets 3 of the second permanent magnet group are uniformly embedded inside the third iron core segment 8 of the armature iron core along the circumferential direction and are aligned to forming a second radial alignment pattern along the radial direction, while each of the permanent magnets 3 are fittingly in direct contact with the housing 1; wherein a length of each of the permanent magnets 3 of the first iron core segment 6 and a length of each of the permanent magnets 3 of the third iron core segment 8 along the axial direction is the same; the first iron core segment 6 embedded with the permanent magnets 3 and the third iron core segment 8 embedded with the permanent magnets 3 have the same structural construction in which each of the two adjacently positioned permanent magnets 3 along the circumferential direction are arranged in opposite polarities and each of the two adjacently positioned permanent magnets 3 along the axial direction are arranged in opposite polarities; wherein a polar distance $\tau_m$ is defined as a distance between the two adjacently positioned permanent magnets aligned along the circumferential direction, where a pitch $\tau_p$ is defined as a distance between two tooth of the rotor teeth 5 which are aligned along the circumferential direction, and a relation between the polar distance and the pitch fulfills the equation $2\tau_m = \tau_p$.

According to the multi-phase reluctance electric motor with transverse magnetic flux of the present invention, the multi-phase reluctance electric motor with transverse magnetic flux according to another preferred embodiment of the present invention comprises a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and a plurality number of permanent magnets 3; wherein each of the armature iron cores comprises a plurality number of iron core poles in which each one of the iron core poles comprises one first iron core segment 6, one second iron core segment 7 and one third iron core segment 8 fittingly arranged together, while a plurality number of axial slots which have the same structural construction are uniformly provided along the circumferential direction at an inner surface of the housing 1 and are aligned to form a radial pattern along the radial direction, and each of the axial slots has a bottom portion having an arc-shaped structure and two side panels extended from two sides of the bottom portion; wherein the number of axial slots is the same as the number of iron core poles of the armature iron core belonging to the same armature iron core; wherein each of the iron core poles of each one of the armature iron core is fittingly positioned in one of the axial slots, and each of the iron core poles is fittingly in direct contact with the bottom portion and the two side panels of the axial slot receiving the particular iron core pole; wherein the second iron core segment 7 is positioned between the first iron core segment 6 and the third iron core segment 8, a height of the first iron core segment 6 along the radial direction is the same as a height of the third iron core segment 8 along the radial direction, a height of the second iron core segment 7 along the radial direction is smaller than the height of the first iron core segment 6 along the radial direction, each of the iron core poles defines one gas partition side panel adjacent to the gas partition channel 30 and has one winding groove provided on the gas partition side panel, and all of the winding grooves of each of the iron core poles of the same armature iron core has the same axial position; wherein the armature coil 2 is an annular armature coil and the armature coil 2 is embedded in the winding grooves of the iron core poles of the armature iron core corresponding to the same armature iron core; wherein each of the plurality number of permanent magnets 3 has a flat-shaped structure and is tangentially magnetized; wherein along the circumferential direction, one piece of permanent magnet 3 is embedded into the center of the first iron core segment 6 of each of the iron core pole, and one piece of permanent magnet 3 is embedded into the center of the third iron core segment 8 of each of the iron core pole; wherein each of the two adjacently positioned permanent magnets 3 along the circumferential direction are arranged in opposite polarities and each of the two adjacently positioned permanent magnets 3 along the axial direction are arranged in opposite polarities; wherein a polar distance $\tau_m$ is defined as a distance between the two adjacently positioned permanent magnets aligned along the circumferential direction, where a pitch $\tau_p$ is defined as a distance between two tooth of the rotor teeth 5 which are aligned along the circumferential direction, and a relation between the polar distance and the pitch fulfills the equation $2\tau_m = \tau_p$.

Advantageous Effect

According to the preferred embodiments of the present invention, unique armature structure is employed to construct the multi-phase reluctance electric motor with transverse magnetic flux such that the mutual inductance between phase transition is eliminated, the control precision in motor current and electromagnetic torque as well as the dynamic characteristics of the system are increased; and the quantity requirement of armature coil 2 is small, the processing procedure is simple, the cost is low, the copper loss is small, and the efficiency is high. The electric motor according to the preferred embodiment of the present invention is simple in design and is easy to increase the torque, therefore modularization can be realized. Meanwhile, because the permanent magnets are positioned on the stator 10, therefore the reliability and safety of the electric motor are improved and its field of applicability is increased.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Embodiment 1

Figure 1:
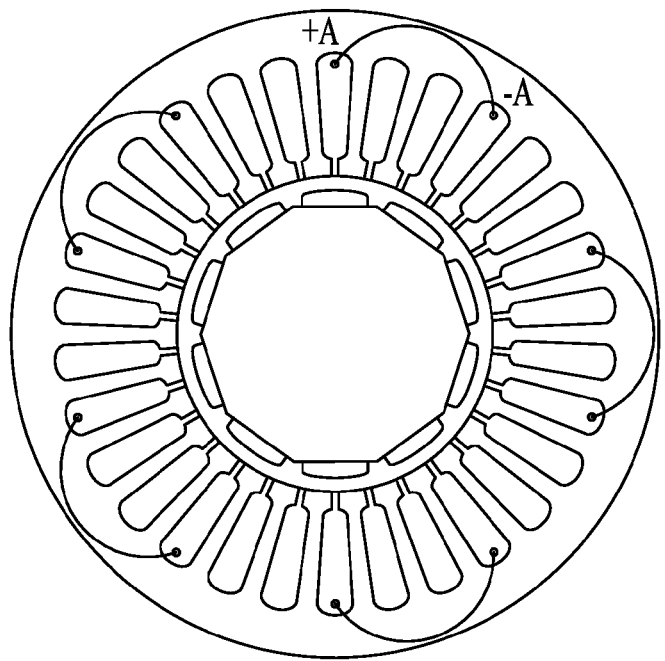
FIG. 1 is the structural illustration of a conventional multi-phase permanent magnet synchronous motor.
Figure 2:
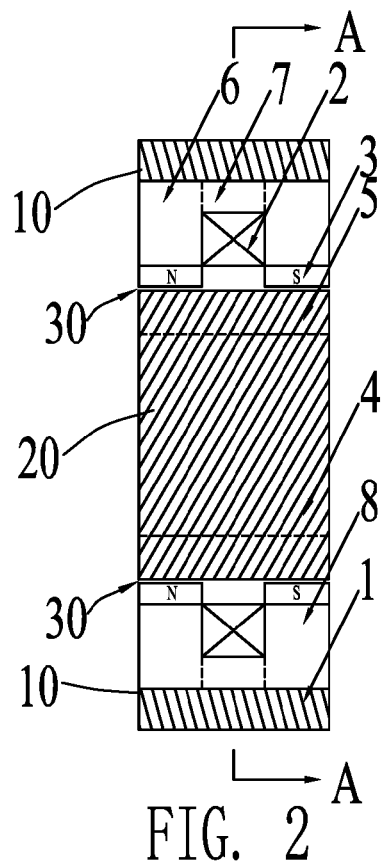
FIG. 2 is the longitudinal sectional view of a one-phase armature member of a multi-phase reluctance electric motor with transverse magnetic flux according to the embodiment 1 of the present invention.
Figure 3:
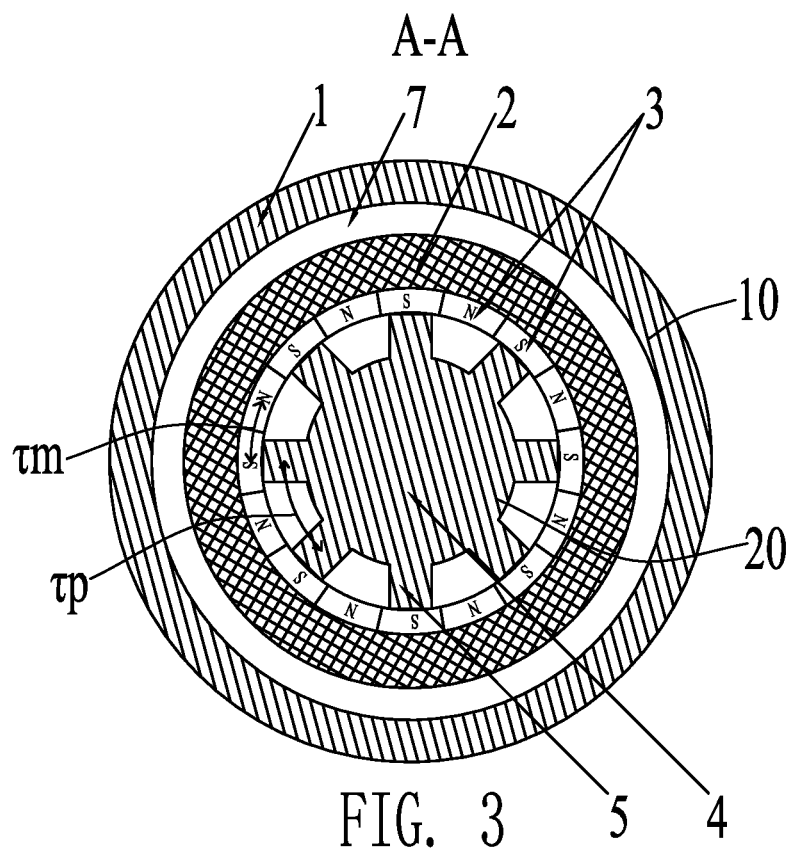
FIG. 3 is an A-A illustration of FIG. 2.
Figure 4:
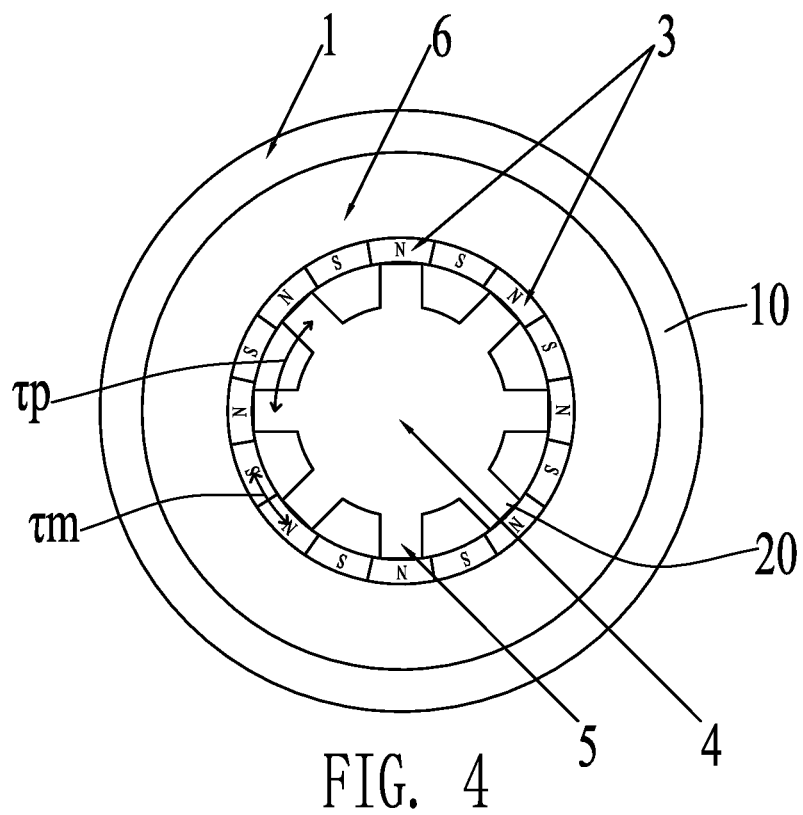
FIG. 4 is a right end view of the one-phase armature member of a multi-phase reluctance electric motor with transverse magnetic flux according to the embodiment 1 of the present invention.

The multi-phase reluctance electric motor with transverse magnetic flux according to this preferred embodiment of the present invention is illustrated in FIG. 2, FIG. 3 and FIG. 4 of the drawings. The multi-phase reluctance electric motor with transverse magnetic flux according to this preferred embodiment of the present invention comprises a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein the armature iron core comprises a first iron core segment 6, a second iron core segment 7 and a third iron core segment 8 in which all of the first, second and third iron core segments have a ring-shaped structure defining an axial direction, a central axis along the axial direction, an outer diameter and an inner diameter respectively, wherein the outer diameter of each of the first, the second and the third iron core segments is the same; wherein the first, the second and the third iron core segments are sequentially and tightly arranged along the axial direction inside the housing 1, and the central axis of the first, the second and the third iron core segments is the same; wherein the second iron core segment 7 is positioned between the first iron core segment 6 and the third iron core segment 8 and the inner diameter of the second iron core segment 7 is greater than that of the first iron core segment 6 and the inner diameter of the third iron core segment 8; wherein the inner diameter of the first iron core segment 6 and the inner diameter of the third iron core segment 8 are the same; wherein the armature coil 2 has an annular coil structure and the armature coil 2 is embedded within an annular space formed between the first iron core segment, the second iron core segment and the third iron core segments; wherein the 2n number of permanent magnets 3 utilizes permanent magnets, each having a tile-shaped structure which is radially magnetized or magnetized in parallel; wherein the 2n number of permanent magnets 3 are divided equally into 2 groups to define a first permanent magnet group and a second permanent magnet group; wherein the permanent magnets of the first permanent magnet group are sequentially and alternately aligned according to a N-pole and a S-pole of each of the permanent magnets along a circumferential direction at an inner surface of the first segment 6; wherein the permanent magnets 3 of the second permanent magnet group are sequentially and alternately aligned according to a S-pole and a N-pole of each of the permanent magnets 3 along a circumferential direction at an inner surface of the third segment 8; wherein the permanent magnets 3 in the first segment 6 and the permanent magnets in the third segment 8 are arranged in opposite polarities and symmetrically along the axis of symmetry of the cross-section of the second segment 7; wherein a polar distance $\tau_m$ is defined as a distance between each two adjacently positioned permanent magnets in the same iron core segment in which the permanent magnets are aligned along the circumferential direction of the corresponding iron core segment, where a pitch $\tau_p$ of the rotor teeth (5) is defined as a distance between two tooth which are aligned along the circumferential direction, and a relation between the polar distance and the pitch fulfills the equation $2\tau_m = \tau_p$.

Embodiment 2

Figure 5:
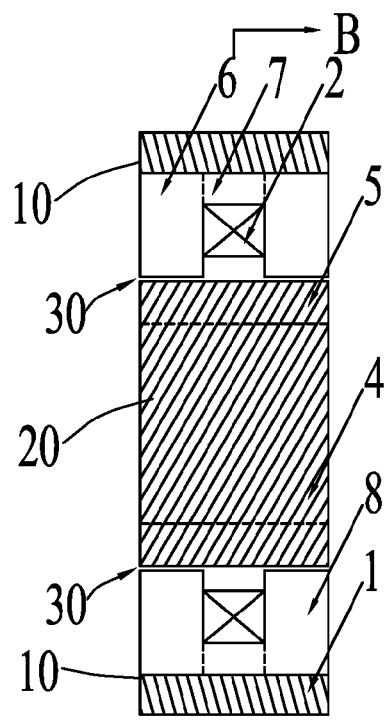
FIG. 5 is the longitudinal sectional view of a one-phase armature member of a multi-phase reluctance electric motor with transverse magnetic flux according to the embodiment 2 of the present invention.
Figure 6:
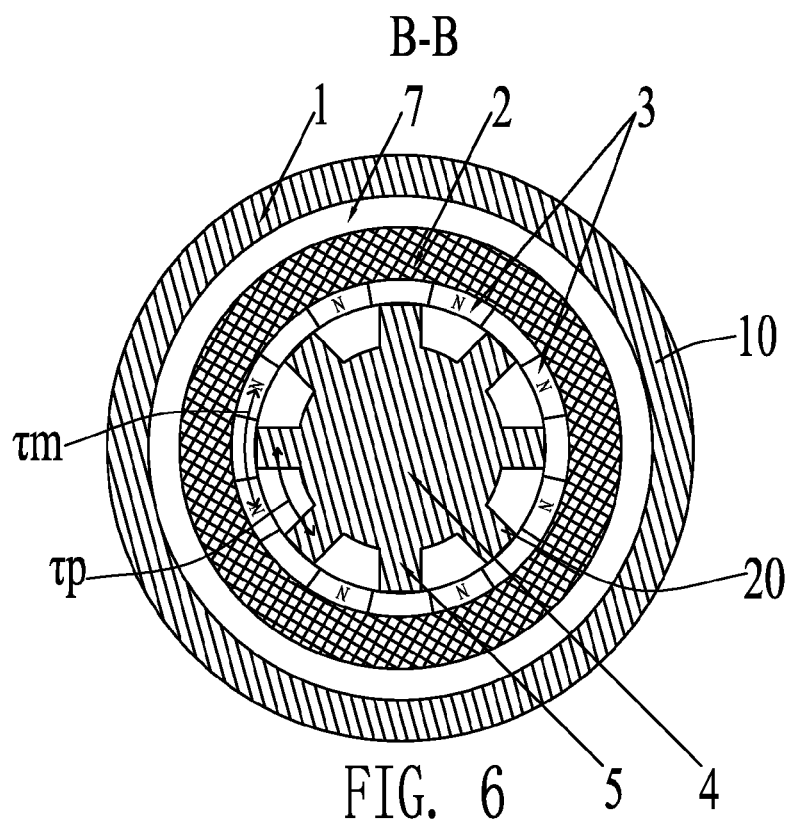
FIG. 6 is an B-B illustration of FIG. 5.
Figure 7:
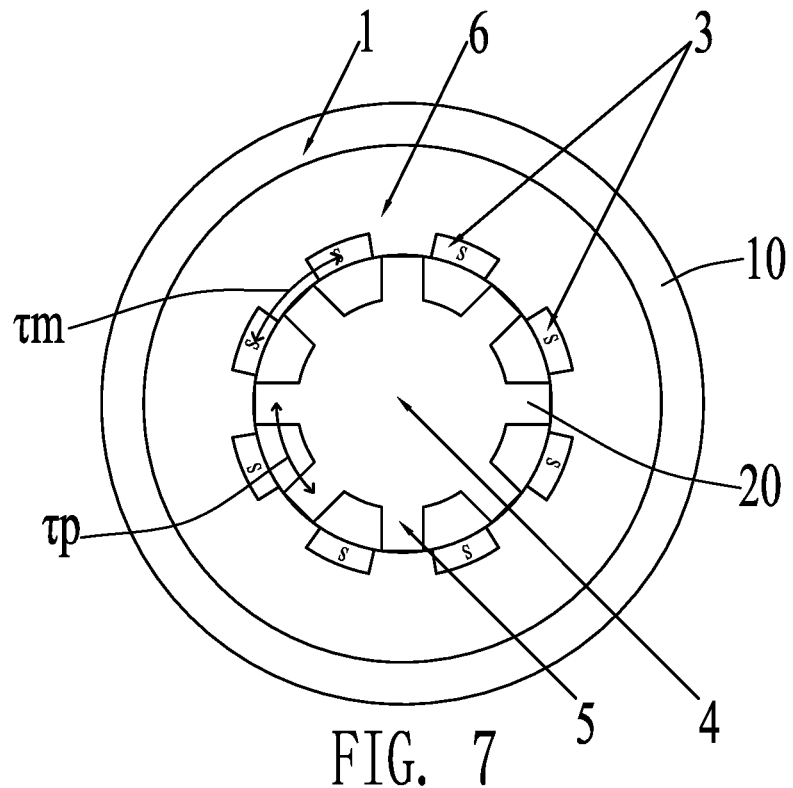
FIG. 7 is a right end view of the one-phase armature member of a multi-phase reluctance electric motor with transverse magnetic flux according to the embodiment 2 of the present invention.

The multi-phase reluctance electric motor with transverse magnetic flux according to this preferred embodiment of the present invention is illustrated in FIG. 5, FIG. 6 and FIG. 7 of the drawings. The multi-phase reluctance electric motor with transverse magnetic flux according to this preferred embodiment of the present invention comprises a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein the armature iron core comprises a first iron core segment 6, a second iron core segment 7 and a third iron core segment 8 in which all of the first, second and third iron core segments have a ring-shaped structure defining an axial direction, a central axis along the axial direction, an outer diameter and an inner diameter respectively, wherein the outer diameter of each of the first, the second and the third iron core segments is the same; wherein the first, the second and the third iron core segments are sequentially and tightly arranged along the axial direction inside the housing 1, and the central axis of the first, the second and the third iron core segments is the same; wherein the second iron core segment 7 is positioned between the first iron core segment 6 and the third iron core segment 8 and the inner diameter of the second iron core segment 7 is greater than that of the first iron core segment 6 and the inner diameter of the third iron core segment 8; wherein the inner diameter of the first iron core segment 6 and the inner diameter of the third iron core segment 8 are the same; wherein the armature coil 2 has an annular coil structure and the armature coil 2 is embedded within an annular space formed between the first iron core segment, the second iron core segment and the third iron core segments; wherein a plurality of axial slots for permanent magnet are uniformly provided along the circumferential direction at an inner circumferential surface of the first iron core segment 6 and at an inner circumferential surface of the third iron core segment 8 respectively; wherein a number of the axial slots in the first iron core segment 6 is the same as a number of the axial slots in the third iron core segment 8; wherein the 2n number of permanent magnets 3 utilizes permanent magnets, each having a tile-shaped structure which is radially magnetized or magnetized in parallel; wherein the 2n number of permanent magnets 3 are divided equally into 2 groups to define a first permanent magnet group and a second permanent magnet group; wherein each of the permanent magnets of the first permanent magnet group are secured into position at one of the axial slot of the first iron core segment 6; wherein each of the permanent magnets of the second permanent magnet group are secured into position at one of the axial slots of the third iron core segment 8; wherein a magnetization direction of each of the permanent magnets which is positioned in the first iron core segment 6 is the same, and the magnetization direction of the permanent magnets in the first iron core segment 6 is pointing to or away from the center; wherein a magnetization direction of each of the plurality of permanent magnets in the third iron core segment 8 is the same, and the magnetization direction of the permanent magnets in the third iron core segment 8 is pointing to or away from the center; wherein the permanent magnets in the first iron core segment 6 and the permanent magnets in the third iron core segment 8 are arranged in opposite polarities and symmetrically along the axis of symmetry of the cross-section of the second iron core segment 7; wherein a polar distance $\tau_m$ is defined as a distance between each two adjacently positioned permanent magnets in the same iron core segment in which the permanent magnets are aligned along the circumferential direction of the corresponding iron core segment, where a pitch $\tau_p$ of the rotor teeth (5) is defined as a distance between two tooth which are aligned along the circumferential direction, and a relation between the polar distance and the pitch fulfills the equation $\tau_m = \tau_p$.

Embodiment 3

Figure 8:
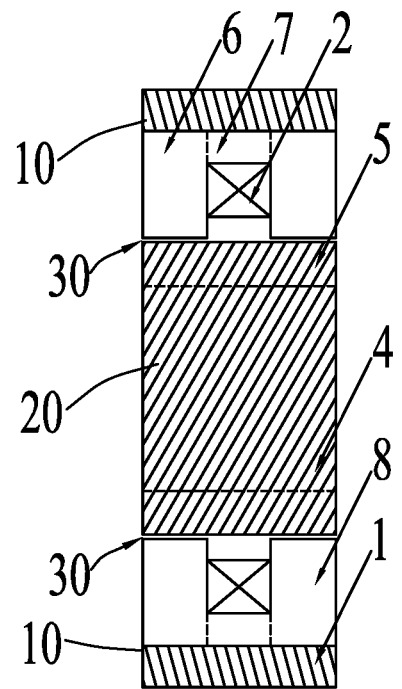
FIG. 8 is the longitudinal sectional view of a one-phase armature member of a multi-phase reluctance electric motor with transverse magnetic flux according to the embodiment 3 of the present invention.
Figure 9:
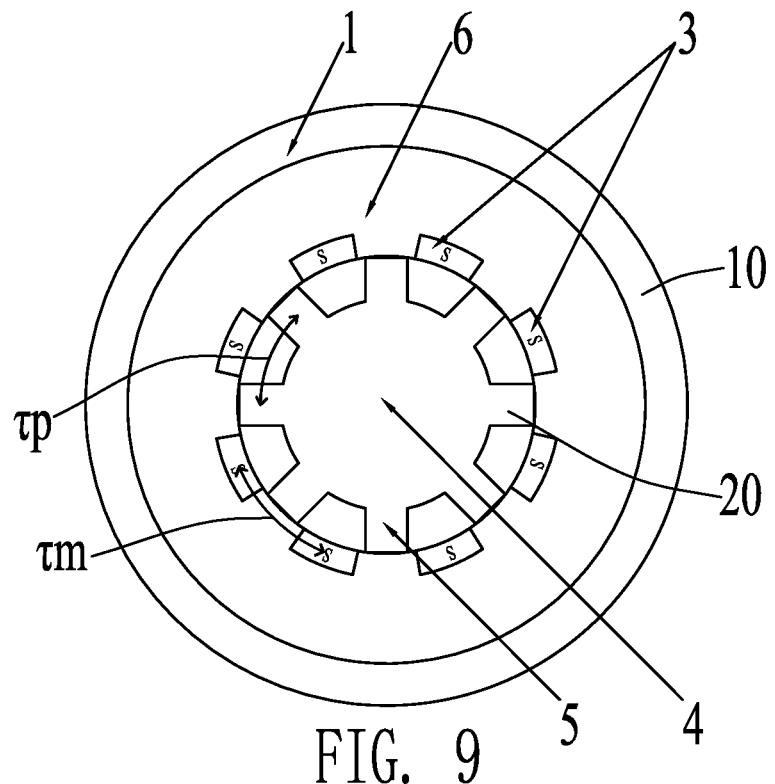
FIG. 9 is a right end view of the one-phase armature member of a multi-phase reluctance electric motor with transverse magnetic flux according to the embodiment 2 of the present invention.
Figure 10:
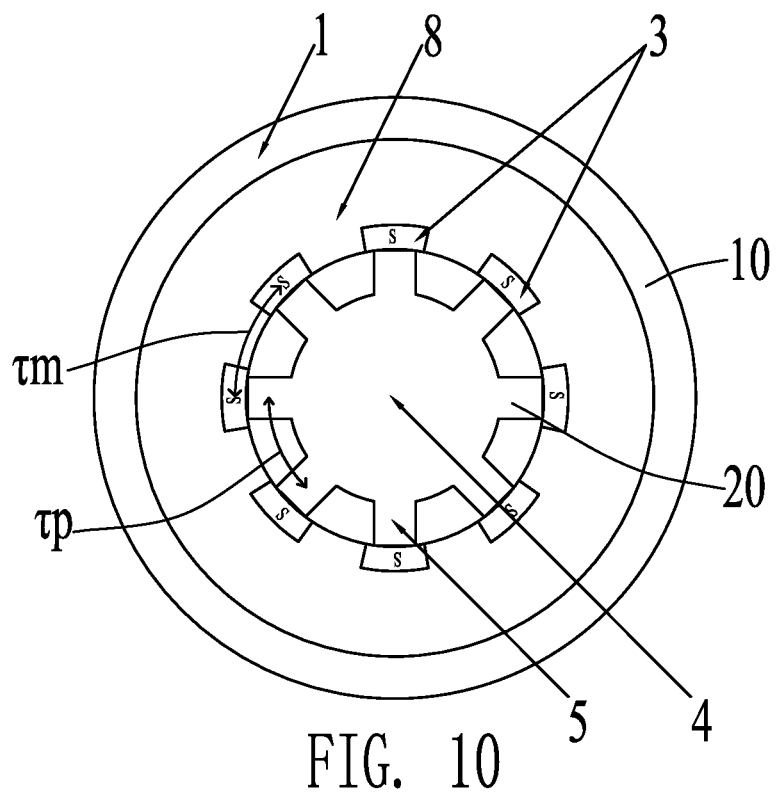
FIG. 10 is a right end view of the one-phase armature member of a multi-phase reluctance electric motor with transverse magnetic flux according to the embodiment 2 of the present invention.

The multi-phase reluctance electric motor with transverse magnetic flux according to this preferred embodiment of the present invention is illustrated in FIG. 8, FIG. 9 and FIG. 10 of the drawings. The multi-phase reluctance electric motor with transverse magnetic flux according to this preferred embodiment of the present invention comprises a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein the armature iron core comprises a first iron core segment 6, a second iron core segment 7 and a third iron core segment 8 in which all of the first, second and third iron core segments have a ring-shaped structure defining an axial direction, a central axis along the axial direction, an outer diameter and an inner diameter respectively, wherein the outer diameter of each of the first, the second and the third iron core segments is the same; wherein the first, the second and the third iron core segments are sequentially and tightly arranged along the axial direction inside the housing 1, and the central axis of the first, the second and the third iron core segments is the same; wherein the second iron core segment 7 is positioned between the first iron core segment 6 and the third iron core segment 8 and the inner diameter of the second iron core segment 7 is greater than that of the first iron core segment 6 and the inner diameter of the third iron core segment 8; wherein the inner diameter of the first iron core segment 6 and the inner diameter of the third iron core segment 8 are the same; wherein the armature coil 2 has an annular coil structure and the armature coil 2 is embedded within an annular space formed between the first iron core segment, the second iron core segment and the third iron core segments; wherein a plurality of axial slots for permanent magnet are uniformly provided along the circumferential direction at an inner circumferential surface of the first iron core segment 6 and at an inner circumferential surface of the third iron core segment 8 respectively; wherein a number of the axial slots in the first iron core segment 6 is the same as a number of the axial slots in the third iron core segment 8; wherein a rotation difference of positions between the axial slots of the first iron core segment 6 and the axial slots of the third iron core segment 8 along the circumferential direction is equal to half of a pitch $\tau_p/2$, where a pitch $\tau_p$ of the rotor teeth (5) is defined as a distance between two tooth which are aligned along the circumferential direction; wherein the 2n number of permanent magnets 3 utilizes permanent magnets, each having a tile-shaped structure which is radially magnetized or magnetized in parallel; wherein the 2n number of permanent magnets 3 are divided equally into 2 groups to define a first permanent magnet group and a second permanent magnet group; wherein each of the permanent magnets of the first permanent magnet group are secured into position at one of the axial slot of the first iron core segment 6; wherein each of the permanent magnets of the second permanent magnet group are secured into position at one of the axial slots of the third iron core segment 8; wherein a magnetization direction of each of the permanent magnets which is positioned in the first iron core segment 6 is the same, and the magnetization direction of the permanent magnets in the first iron core segment 6 is pointing to or away from the center; wherein a magnetization direction of each of the plurality of permanent magnets in the third iron core segment 8 is the same, and the magnetization direction of the permanent magnets in the third iron core segment 8 is pointing to or away from the center; wherein the permanent magnets in the first iron core segment 6 and the permanent magnets in the third iron core segment 8 are arranged in the same polarities; wherein a polar distance $\tau_m$ is defined as a distance between each two adjacently positioned permanent magnets in the same iron core segment in which the permanent magnets are aligned along the circumferential direction of the corresponding iron core segment, and a relation between the polar distance and the pitch fulfills the equation $\tau_m = \tau_p$.

Embodiment 4

Figure 11:
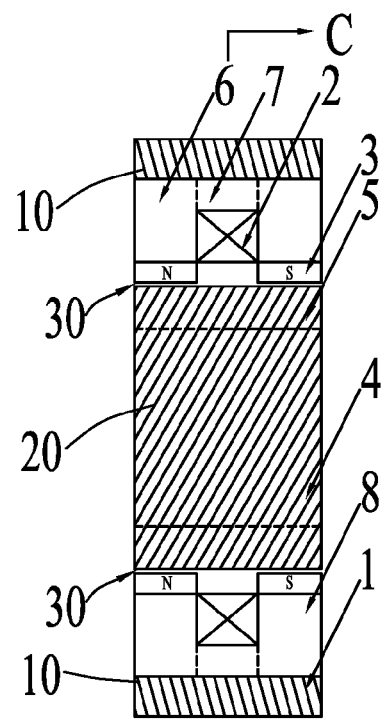
FIG. 11 is the longitudinal sectional view of a one-phase armature member of a multi-phase reluctance electric motor with transverse magnetic flux according to the embodiment 4 of the present invention.
Figure 12:
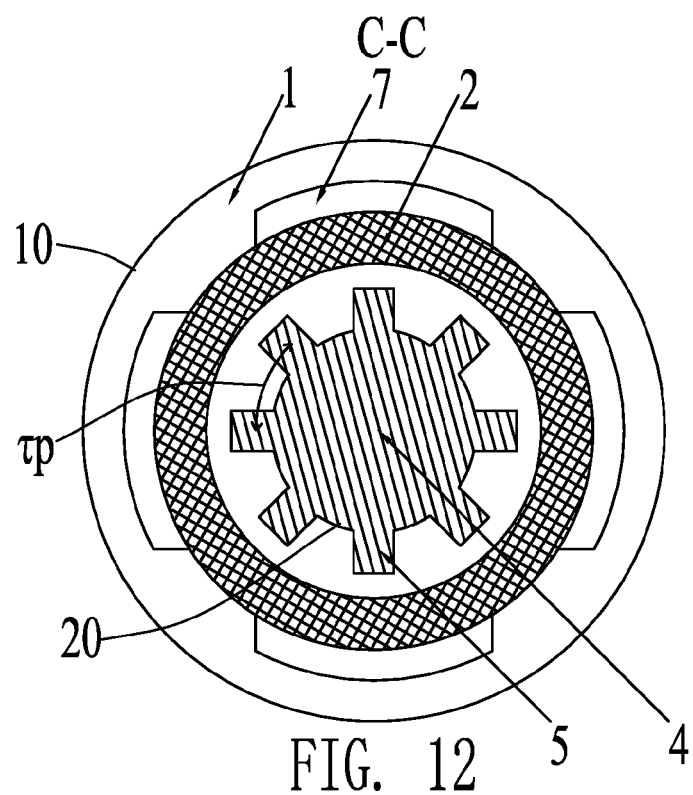
FIG. 12 is a C-C illustration of FIG. 11.
Figure 13:
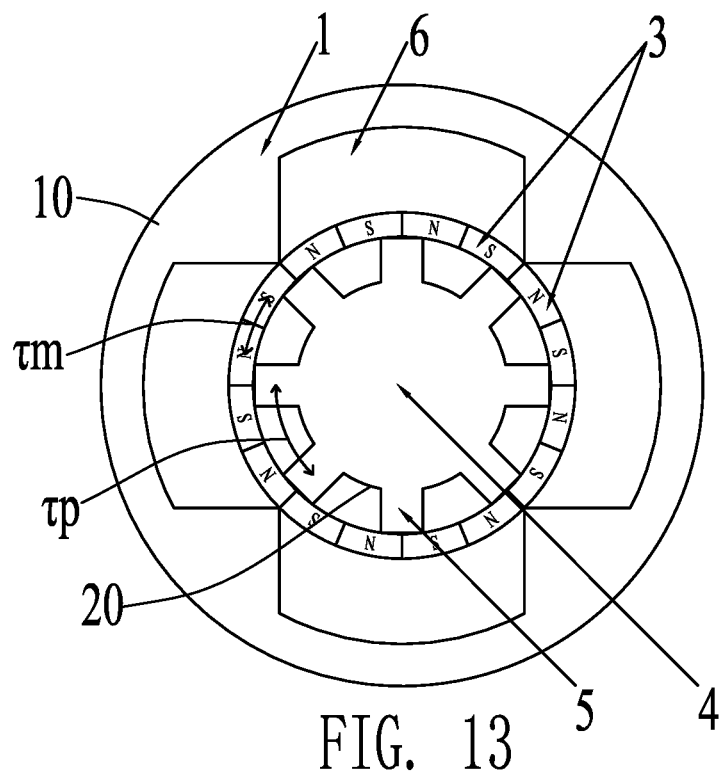
FIG. 13 is a right end view of the one-phase armature member of a multi-phase reluctance electric motor with transverse magnetic flux according to the embodiment 4 of the present invention.
Figure 14:
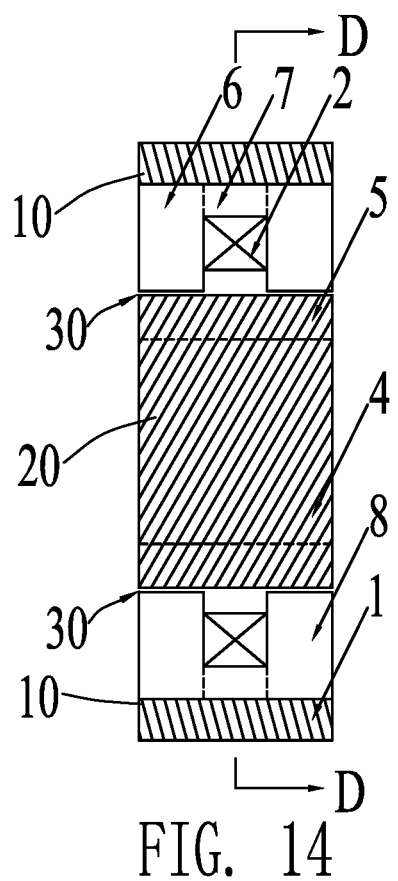
FIG. 14 is the longitudinal sectional view of a one-phase armature member of a multi-phase reluctance electric motor with transverse magnetic flux according to the embodiment 5 of the present invention.
Figure 15:
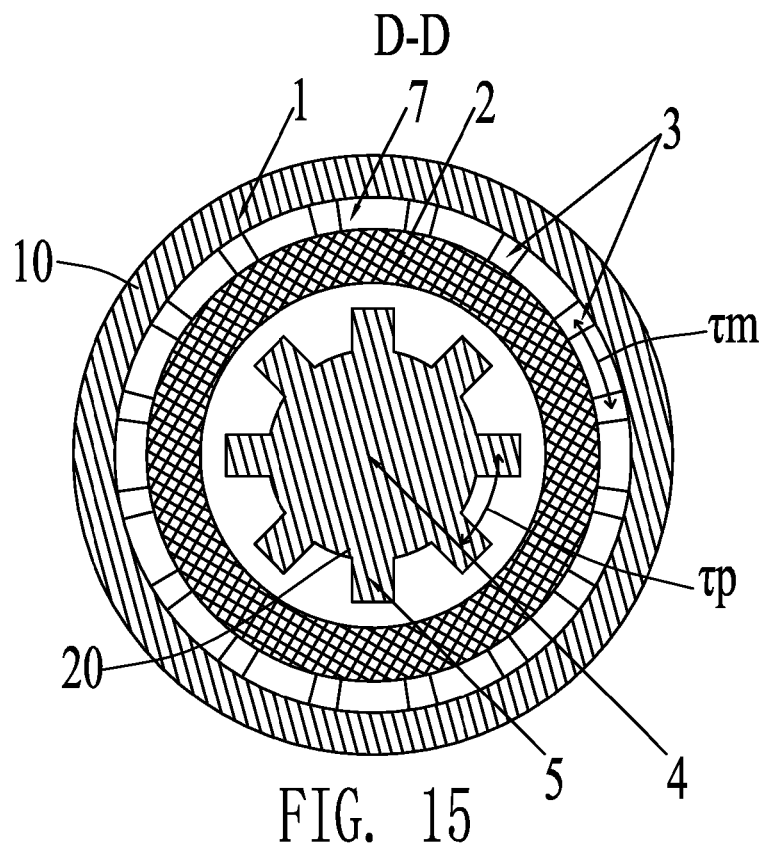
FIG. 15 is a D-D illustration of FIG. 14.
Figure 16:
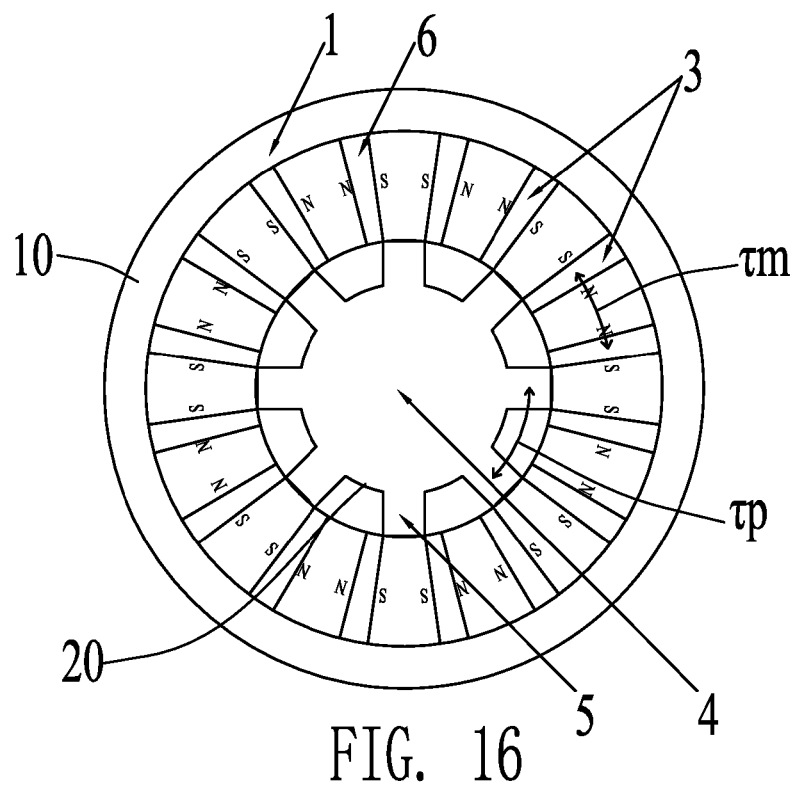
FIG. 16 is a right end view of the one-phase armature member of a multi-phase reluctance electric motor with transverse magnetic flux according to the embodiment 5 of the present invention.
Figure 17:
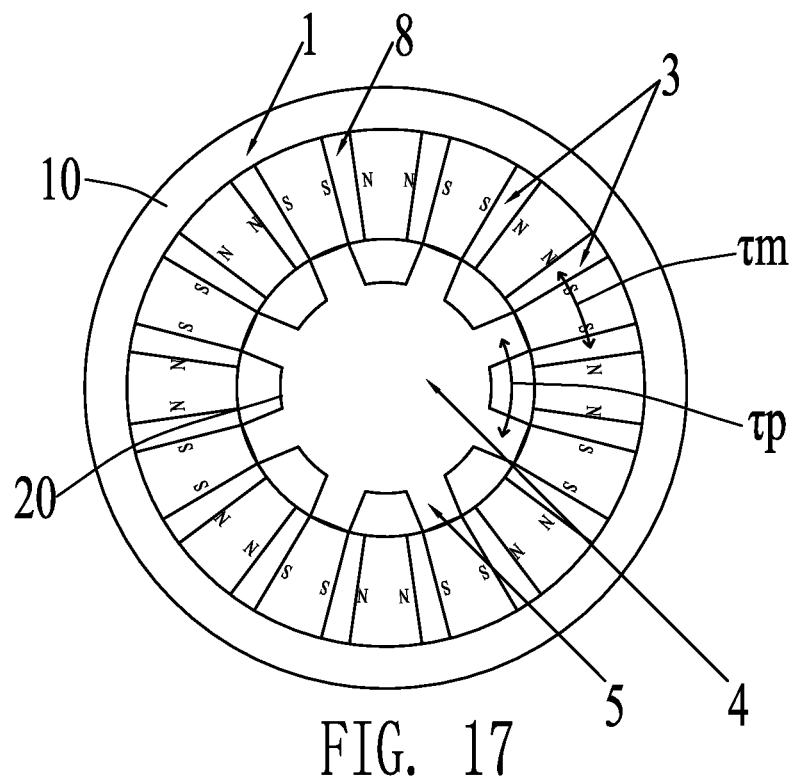
FIG. 17 is a left end view of the one-phase armature member of a multi-phase reluctance electric motor with transverse magnetic flux according to the embodiment 5 of the present invention.
Figure 18:
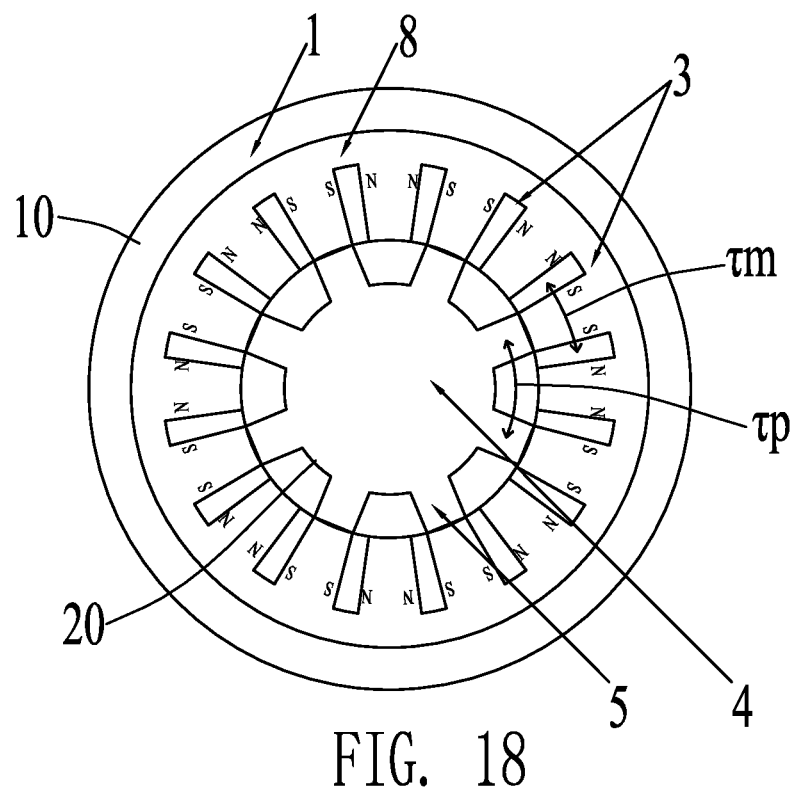
FIG. 18 is a left end view of the one-phase armature member of a multi-phase reluctance electric motor with transverse magnetic flux with an alternative structural construction according to the embodiment 5 of the present invention.
Figure 19:
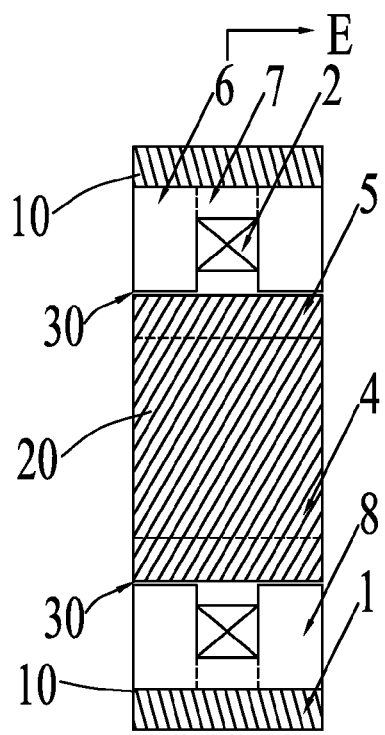
FIG. 19 is the longitudinal sectional view of a one-phase armature member of a multi-phase reluctance electric motor with transverse magnetic flux according to the embodiment 6 of the present invention.
Figure 20:
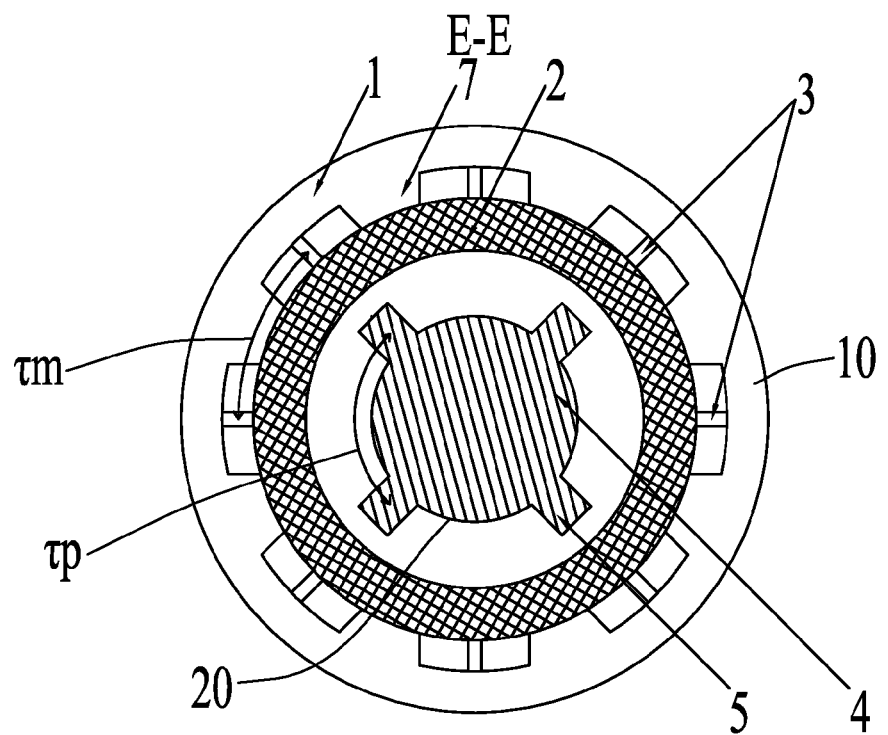
FIG. 20 is an E-E illustration of FIG. 19.
Figure 21:
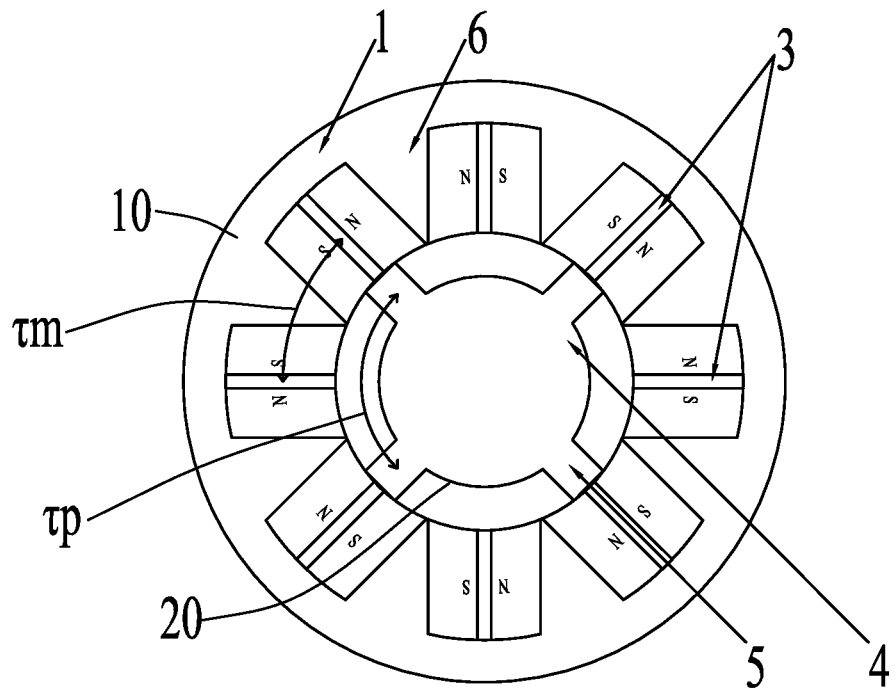
FIG. 21 is a right end view of the one-phase armature member of a multi-phase reluctance electric motor with transverse magnetic flux according to the embodiment 6 of the present invention.
Figure 22:
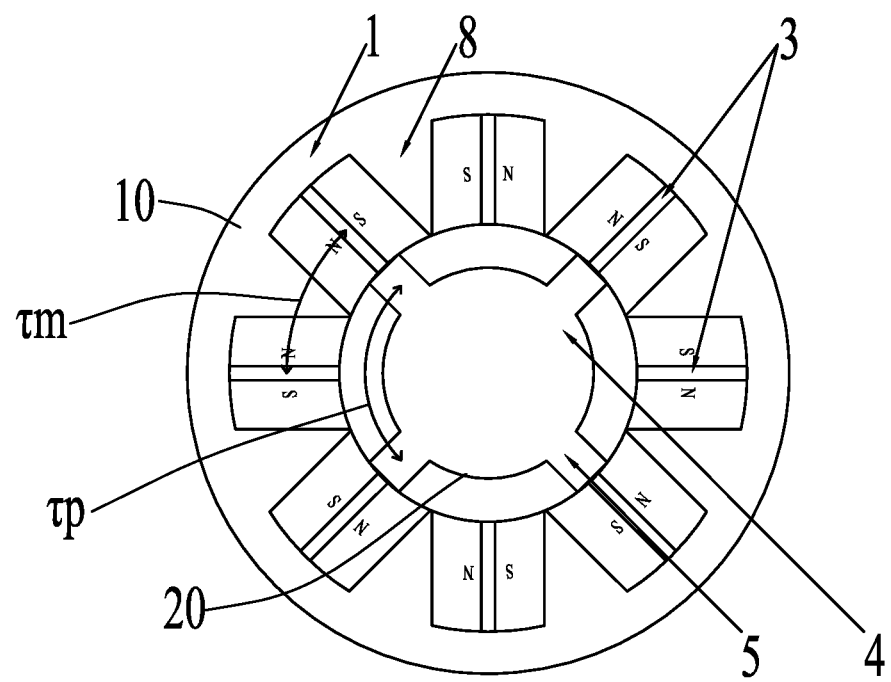
FIG. 22 is a left end view of the one-phase armature member of a multi-phase reluctance electric motor with transverse magnetic flux according to the embodiment 6 of the present invention.

The multi-phase reluctance electric motor with transverse magnetic flux according to this preferred embodiment of the present invention is illustrated in FIG. 11, FIG. 12 and FIG. 13 of the drawings. The multi-phase reluctance electric motor with transverse magnetic flux according to this preferred embodiment of the present invention comprises a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnets 3; wherein n is a positive integer; wherein each of the armature iron cores comprises n number of iron core poles and each one of the iron core poles comprises one first iron core segment 6, one second iron core segment 7 and one third iron core segment 8 fittingly arranged together, while n number of axial slots are uniformly provided along the circumferential direction at an inner surface of the housing 1 and each of the axial slots has a bottom portion having an arc-shaped structure and two side panels which are parallel to each other; wherein the number of axial slots is the same as the number of iron core poles of the armature iron core in the same armature iron core, the n number of iron core poles of each of the armature iron core are sequentially positioned in the axial slots along the circumferential direction respectively, and each of the iron core pole are fittingly in direct contact with the bottom portion and the two side panels of the axial slot corresponding to the particular iron core pole; wherein a height of the first iron core segment 6 along a radial direction is the same as a height of the third iron core segment 8 along the radial direction, a height of the second iron core segment 7 along the radial direction is smaller than the height of the first iron core segment 6 along the radial direction, each of the iron core poles define one gas partition side panel adjacent to the gas partition channel 30 and has one winding groove provided on the gas partition side panel, and all of the winding grooves of the n number of iron core poles of the same armature iron core have the same axial position; wherein the armature coil 2 is an annular armature coil and the armature coil 2 is embedded in the winding grooves of the n number of iron core poles of the armature iron core corresponding to the same armature iron core; wherein the 2n number of permanent magnets 3 utilizes radially magnetized or magnetized in parallel tile-shaped permanent magnets; wherein the 2n number of permanent magnets 3 are positioned at an inner surface of the first iron core segment 6 and at an inner surface of the third iron core segment 8 of the n number of iron core poles respectively; wherein each of the two adjacently positioned permanent magnets 3 belonging to the same particular iron core pole are arranged in opposite polarities and each of the two adjacently positioned permanent magnets 3 along the circumferential direction are also arranged in opposite polarities; wherein a polar distance $\tau_m$ is defined as a distance between the two adjacently positioned permanent magnets aligned along the circumferential direction, where a pitch $\tau_p$ is defined as a distance between two tooth of the rotor teeth 5 which are aligned along the circumferential direction, and a relation between the polar distance and the pitch fulfills the equation $2\tau_m = \tau_p$.

Embodiment 5

The multi-phase reluctance electric motor with transverse magnetic flux according to this preferred embodiment of the present invention is illustrated in FIG. 14 to FIG. 18 of the drawings. The multi-phase reluctance electric motor with transverse magnetic flux according to this preferred embodiment of the present invention comprises a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and 2n number of permanent magnet magnets 3; wherein n is an even number; wherein the armature iron core comprises a first iron core segment 61, a second iron core segment 71 and a third iron core segment 81, all of the first, the second and the third iron core segments have a ring-shaped structure, each of which defines a central axis, an outer diameter and an inner diameter respectively, the first, the second and the third iron core segments are sequentially and tightly arranged along an axial direction inside the housing 1, the central axis of the first, the second and the third iron core segments is the same, the outer diameter of the first, the second and the third segments is the same, the second iron core segment 7 is positioned between the first iron core segment 6 and the third iron core segment 8, the inner diameter of the second iron core segment 7 is greater than the inner diameter of the first iron core segment 7, and the inner diameter of the first iron core segment 6 and the inner diameter of the third iron core segment 8 are the same; wherein the armature coil 2 is an annular armature coil and the armature coil 2 is embedded within an annular space formed between the first iron core segment 6, the second iron core segment 7 and the third iron core segment 8; wherein each of the 2n number of permanent magnets 3 has a flat-shaped structure and is tangentially magnetized; wherein the 2n number of permanent magnets 3 are divided equally into 2 groups to define a first permanent magnet group and a second permanent magnet group; wherein the n number of permanent magnets 3 of the first permanent magnet group are uniformly embedded inside the first iron core segment 6 of the armature iron core along the circumferential direction and are aligned to forming a first radial alignment pattern along the radial direction; wherein the n number of permanent magnets 3 of the second permanent magnet group are uniformly embedded inside the third iron core segment 8 of the armature iron core along the circumferential direction and are aligned to forming a second radial alignment pattern along the radial direction, while each of the permanent magnets 3 are fittingly in direct contact with the housing 1; wherein a length of each of the permanent magnets 3 of the first iron core segment 6 and a length of each of the permanent magnets 3 of the third iron core segment 8 along the axial direction is the same; the first iron core segment 6 embedded with the permanent magnets 3 and the third iron core segment 8 embedded with the permanent magnets 3 have the same structural construction in which each of the two adjacently positioned permanent magnets 3 along the circumferential direction are arranged in opposite polarities and each of the two adjacently positioned permanent magnets 3 along the axial direction are arranged in opposite polarities; wherein a polar distance $\tau_m$ is defined as a distance between the two adjacently positioned permanent magnets aligned along the circumferential direction, where a pitch $\tau_p$ is defined as a distance between two tooth of the rotor teeth 5 which are aligned along the circumferential direction, and a relation between the polar distance and the pitch fulfills the equation $2\tau_m = \tau_p$.

Embodiment 6

The multi-phase reluctance electric motor with transverse magnetic flux according to this preferred embodiment of the present invention is illustrated in FIG. 19 to FIG. 22 of the drawings. The multi-phase reluctance electric motor with transverse magnetic flux according to this preferred embodiment of the present invention comprises a stator 10 and a rotor 20; wherein a gas partition channel 30 is defined between the stator 10 and the rotor 20; wherein the rotor 20 comprises a rotor frame unit 4 and a plurality of rotor teeth 5; wherein the plurality of rotor teeth 5 are uniformly distributed along the outer circumferential portion of the rotor frame unit 4; wherein the rotor frame unit 4 and the rotor teeth 5 have an integrated structure; wherein the stator 10 comprises a housing 1 and an armature unit with m number of phases defining m number of single-phase armature members, where m is the number of phases of the electric motor and m is equal to or greater than 3; wherein the housing 1 has a cylindrical structure; wherein the m number of armature members of the armature unit are sequentially arranged along an axial direction inside the housing, and the single-phase armature members are sequentially staggered along an circumferential direction at an electrical angle of 360°/m; wherein each of the single-phase armature member comprises an armature iron core, an armature coil 2 and a plurality number of permanent magnets 3; wherein each of the armature iron cores comprises a plurality number of iron core poles in which each one of the iron core poles comprises one first iron core segment 6, one second iron core segment 7 and one third iron core segment 8 fittingly arranged together, while a plurality number of axial slots which have the same structural construction are uniformly provided along the circumferential direction at an inner surface of the housing 1 and are aligned to form a radial pattern along the radial direction, and each of the axial slots has a bottom portion having an arc-shaped structure and two side panels extended from two sides of the bottom portion; wherein the number of axial slots is the same as the number of iron core poles of the armature iron core belonging to the same armature iron core; wherein each of the iron core poles of each one of the armature iron core is fittingly positioned in one of the axial slots, and each of the iron core poles is fittingly in direct contact with the bottom portion and the two side panels of the axial slot receiving the particular iron core pole; wherein the second iron core segment 7 is positioned between the first iron core segment 6 and the third iron core segment 8, a height of the first iron core segment 6 along the radial direction is the same as a height of the third iron core segment 8 along the radial direction, a height of the second iron core segment 7 along the radial direction is smaller than the height of the first iron core segment 6 along the radial direction, each of the iron core poles defines one gas partition side panel adjacent to the gas partition channel 30 and has one winding groove provided on the gas partition side panel, and all of the winding grooves of each of the iron core poles of the same armature iron core has the same axial position; wherein the armature coil 2 is an annular armature coil and the armature coil 2 is embedded in the winding grooves of the iron core poles of the armature iron core corresponding to the same armature iron core; wherein each of the plurality number of permanent magnet (3) has a flat-shaped structure and is tangentially magnetized; wherein along the circumferential direction, one piece of permanent magnet 3 is embedded into the center of the first iron core segment 6 of each of the iron core pole, and one piece of permanent magnet 3 is embedded into the center of the third iron core segment 8 of each of the iron core pole; wherein each of the two adjacently positioned permanent magnets 3 along the circumferential direction are arranged in opposite polarities and each of the two adjacently positioned permanent magnets 3 along the axial direction are arranged in opposite polarities; wherein a polar distance $\tau_m$ is defined as a distance between the two adjacently positioned permanent magnets aligned along the circumferential direction, where a pitch $\tau_p$ is defined as a distance between two tooth of the rotor teeth 5 which are aligned along the circumferential direction, and a relation between the polar distance and the pitch fulfills the equation $2\tau_m = \tau_p$.

Embodiment 7

The multi-phase reluctance electric motor with transverse magnetic flux according to this preferred embodiment of the present invention is different from the above embodiments 1, 2, 3, 4, 5 or 6 in that the rotor teeth 5 utilizes rotor teeth with high magnetic permeability. All other elements and connection of elements are the same as the above embodiments 1, 2, 3, 4, 5 or 6.

Embodiment 8

The multi-phase reluctance electric motor with transverse magnetic flux according to this preferred embodiment of the present invention is different from the above embodiments 1, 2, 3, 4, 5 or 6 in that the rotor frame unit utilizes magnetic rotor frame unit or non-magnetic rotor frame unit. That is the rotor frame unit is magnetized or is made of non-magnetic materials. All other elements and connection of elements are the same as the above embodiments 1, 2, 3, 4, 5 or 6.

Embodiment 9

The multi-phase reluctance electric motor with transverse magnetic flux according to this preferred embodiment of the present invention is different from the above embodiments 1, 2, 3, 4, 5 or 6 in that the first iron core segment 6, the second iron core segment 7 and the third iron core segment 8 are integral in structure or separate (non-integral) in structure. All other elements and connection of elements are the same as the above embodiments 1, 2, 3, 4, 5 or 6.

Embodiment 10

The multi-phase reluctance electric motor with transverse magnetic flux according to this preferred embodiment of the present invention is different from the above embodiments 1, 2, 3, 4, 5 or 6 in that a thickness of each of the permanent magnets defined along the tangential direction of a side of the housing is greater than or equal to a thickness of the permanent magnets 3 defined along the gas partition side panel. All other elements and connection of elements are the same as the above embodiments 1, 2, 3, 4, 5 or 6.

Embodiment 11

The multi-phase reluctance electric motor with transverse magnetic flux according to this preferred embodiment of the present invention is different from the above embodiments 1, 2, 3, 4, 5 or 6 in that each of the iron core poles has a laminated structure comprising a plurality of silicon steel sheets compressed together to form the laminated structure which defines a lamination direction along a tangential direction. All other elements and connection of elements are the same as the above embodiments 1, 2, 3, 4, 5 or 6.

According to the above preferred embodiments of the present invention, the permanent magnet which has a tile-shaped structure is radially magnetized or magnetized in parallel, wherein radially magnetized refers to that the permanent magnet is magnetized along the direction of the radius, while magnetized in parallel refers to that the center of the permanent magnet is magnetized along the direction of the radius, and the remaining portion of the permanent magnet is magnetized in parallel direction with respect to the magnetized direction of the center of the permanent magnet in which the center of the permanent magnet is magnetized along the direction of the radius.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multi-phase reluctance electric motor with transverse magnetic flux, characterized in that: said electric motor comprises a stator (10) and a rotor (20); wherein a gas partition channel (30) is defined between said stator (10) and said rotor (20); wherein said rotor (20) comprises a rotor frame unit (4) and a plurality of rotor teeth (5); wherein said plurality of rotor teeth (5) are uniformly distributed along said outer circumferential portion of said rotor frame unit (4); wherein said rotor frame unit (4) and said rotor teeth (5) have an integrated structure; wherein said stator (10) comprises a housing (1) and an armature unit with m number of phases defining m number of single-phase armature members, where m is said number of phases of said electric motor and m is equal to or greater than 3; wherein said housing (1) has a cylindrical structure; wherein said m number of armature members of said armature unit are sequentially arranged along an axial direction inside said housing, and said single-phase armature members are sequentially staggered along an circumferential direction at an electrical angle of 360°/m; wherein each of said single-phase armature member comprises an armature iron core, an armature coil (2) and 2n number of permanent magnets (3); wherein n is a positive integer; wherein said armature iron core comprises a first iron core segment (6), a second iron core segment (7) and a third iron core segment (8) in which all of said first, second and third iron core segments have a ring-shaped structure defining an axial direction, a central axis along said axial direction, an outer diameter and an inner diameter respectively, wherein said outer diameter of each of said first, said second and said third iron core segments is the same; wherein said first, said second and said third iron core segments are sequentially and tightly arranged along said axial direction inside said housing (1), and said central axis of said first, said second and said third iron core segments is the same; wherein said second iron core segment (7) is positioned between said first iron core segment (6) and said third iron core segment (8) and said inner diameter of said second iron core segment (7) is greater than that of said first iron core segment (6) and said inner diameter of said third iron core segment (8); wherein said inner diameter of said first iron core segment (6) and said inner diameter of said third iron core segment (8) are the same; wherein said armature coil (2) has an annular coil structure and said armature coil (2) is embedded within an annular space formed between said first iron core segment, said second iron core segment and said third iron core segments; wherein said 2n number of permanent magnets (3) utilizes permanent magnets having a tile-shaped structure which is radially magnetized or magnetized in parallel; wherein said 2n number of permanent magnets (3) are divided equally into 2 groups to define a first permanent magnet group and a second permanent magnet group; wherein said permanent magnets of said first permanent magnet group are sequentially and alternately aligned according to a N-pole and a S-pole of each of said permanent magnets along a circumferential direction at an inner surface of said first segment (6); wherein said permanent magnets (3) of said second permanent magnet group are sequentially and alternately aligned according to a S-pole and a N-pole of each of said permanent magnet (3) along a circumferential direction at an inner surface of said third segment (8); wherein said permanent magnets (3) in said first segment (6) and said permanent magnets in said third segment (8) are arranged in opposite polarities and symmetrically along said axis of symmetry of said cross-section of said second segment (7); wherein a polar distance $\tau_m$ is defined as a distance between each two adjacently positioned permanent magnets in said same iron core segment in which said permanent magnets are aligned along said circumferential direction of said corresponding iron core segment, where a pitch $\tau_p$ of said rotor teeth (5) is defined as a distance between two tooth which are aligned along said circumferential direction, and a relation between said polar distance and said pitch fulfills the equation $2\tau_m = \tau_p$.

2. The multi-phase reluctance electric motor with transverse magnetic flux according to claim 1, characterized in that, wherein said rotor teeth (5) have a high magnetic permeability.

3. The multi-phase reluctance electric motor with transverse magnetic flux according to claim 1, characterized in that, wherein said first iron core segment (6), said second iron core segment (7) and said third iron core segment (8) are integral in structure or non-integral in structure.

4. A multi-phase reluctance electric motor with transverse magnetic flux, characterized in that: said electric motor comprises a stator (10) and a rotor (20); wherein a gas partition channel (30) is defined between said stator (10) and said rotor (20); wherein said rotor (20) comprises a rotor frame unit (4) and a plurality of rotor teeth (5); wherein said plurality of rotor teeth (5) are uniformly distributed along said outer circumferential portion of said rotor frame unit (4); wherein said rotor frame unit (4) and said rotor teeth (5) have an integrated structure; wherein said stator (10) comprises a housing (1) and an armature unit with m number of phases defining m number of single-phase armature members, where m is said number of phases of said electric motor and m is equal to or greater than 3; wherein said housing (1) has a cylindrical structure; wherein said m number of armature members of said armature unit are sequentially arranged along an axial direction inside said housing, and said single-phase armature members are sequentially staggered along an circumferential direction at an electrical angle of 360°/m; wherein each of said single-phase armature member comprises an armature iron core, an armature coil (2) and 2n number of permanent magnets (3); wherein n is a positive integer; wherein said armature iron core comprises a first iron core segment (6), a second iron core segment (7) and a third iron core segment (8) in which all of said first, second and third iron core segments have a ring-shaped structure defining an axial direction, a central axis along said axial direction, an outer diameter and an inner diameter respectively, wherein said outer diameter of each of said first, said second and said third iron core segments is the same; wherein said first, said second and said third iron core segments are sequentially and tightly arranged along said axial direction inside said housing (1), and said central axis of said first, said second and said third iron core segments is the same; wherein said second iron core segment (7) is positioned between said first iron core segment (6) and said third iron core segment (8) and said inner diameter of said second iron core segment (7) is greater than that of said first iron core segment (6) and said inner diameter of said third iron core segment (8); wherein said inner diameter of said first iron core segment (6) and said inner diameter of said third iron core segment (8) are the same; wherein said armature coil (2) has an annular coil structure and said armature coil (2) is embedded within an annular space formed between said first iron core segment, said second iron core segment and said third iron core segments; wherein a plurality of axial slots for permanent magnet are uniformly provided along said circumferential direction at an inner circumferential surface of said first iron core segment (6) and at an inner circumferential surface of said third iron core segment (8) respectively; wherein a number of said axial slots in said first iron core segment (6) is said same as a number of said axial slots in said third iron core segment (8); wherein said 2n number of permanent magnets (3) utilizes permanent magnet having a tile-shaped structure which is radially magnetized or magnetized in parallel; wherein said 2n number of permanent magnets (3) are divided equally into 2 groups to define a first permanent magnet group and a second permanent magnet group; wherein each of said permanent magnets of said first permanent magnet group are secured into position at one of said axial slot of said first iron core segment (6); wherein each of said permanent magnets of said second permanent magnet group are secured into position at one of said axial slots of said third iron core segment (8); wherein a magnetization direction of each of said permanent magnets which is positioned in said first iron core segment (6) is the same, and said magnetization direction of said permanent magnets in said first iron core segment (6) is pointing to or away from said center; wherein a magnetization direction of each of said plurality of permanent magnets in said third iron core segment (8) is the same, and said magnetization direction of said permanent magnets in said third iron core segment (8) is pointing to or away from said center; wherein said permanent magnets in said first iron core segment (6) and said permanent magnets in said third iron core segment (8) are arranged in opposite polarities and symmetrically along said axis of symmetry of said cross-section of said second iron core segment (7); wherein a polar distance $\tau_m$ is defined as a distance between each two adjacently positioned permanent magnets in said same iron core segment in which said permanent magnets are aligned along said circumferential direction of said corresponding iron core segment, where a pitch $\tau_p$ of said rotor teeth (5) is defined as a distance between two tooth which are aligned along said circumferential direction, and a relation between said polar distance and said pitch fulfills the equation $\tau_m = \tau_p$.

5. The multi-phase reluctance electric motor with transverse magnetic flux according to claim 4, characterized in that, wherein said rotor teeth (5) have a high magnetic permeability.

6. The multi-phase reluctance electric motor with transverse magnetic flux according to claim 4, characterized in that, wherein said first iron core segment (6), said second iron core segment (7) and said third iron core segment (8) are integral in structure or non-integral in structure.

7. A multi-phase reluctance electric motor with transverse magnetic flux, characterized in that: said electric motor comprises a stator (10) and a rotor (20); wherein a gas partition channel (30) is defined between said stator (10) and said rotor (20); wherein said rotor (20) comprises a rotor frame unit (4) and a plurality of rotor teeth (5); wherein said plurality of rotor teeth (5) are uniformly distributed along said outer circumferential portion of said rotor frame unit (4); wherein said rotor frame unit (4) and said rotor teeth (5) have an integrated structure; wherein said stator (10) comprises a housing (1) and an armature unit with m number of phases defining m number of single-phase armature members, where m is said number of phases of said electric motor and m is equal to or greater than 3; wherein said housing (1) has a cylindrical structure; wherein said m number of armature members of said armature unit are sequentially arranged along an axial direction inside said housing, and said single-phase armature members are sequentially staggered along an circumferential direction at an electrical angle of 360°/m; wherein each of said single-phase armature member comprises an armature iron core, an armature coil (2) and 2n number of permanent magnets (3); wherein n is a positive integer; wherein said armature iron core comprises a first iron core segment (6), a second iron core segment (7) and a third iron core segment (8) in which all of said first, second and third iron core segments have a ring-shaped structure defining an axial direction, a central axis along said axial direction, an outer diameter and an inner diameter respectively, wherein said outer diameter of each of said first, said second and said third iron core segments is the same; wherein said first, said second and said third iron core segments are sequentially and tightly arranged along said axial direction inside said housing (1), and said central axis of said first, said second and said third iron core segments is the same; wherein said second iron core segment (7) is positioned between said first iron core segment (6) and said third iron core segment (8) and said inner diameter of said second iron core segment (7) is greater than that of said first iron core segment (6) and said inner diameter of said third iron core segment (8); wherein said inner diameter of said first iron core segment (6) and said inner diameter of said third iron core segment (8) are the same; wherein said armature coil (2) has an annular coil structure and said armature coil (2) is embedded within an annular space formed between said first iron core segment, said second iron core segment and said third iron core segments; wherein a plurality of axial slots for permanent magnet are uniformly provided along said circumferential direction at an inner circumferential surface of said first iron core segment (6) and at an inner circumferential surface of said third iron core segment (8) respectively; wherein a number of said axial slots in said first iron core segment (6) is the same as a number of said axial slots in said third iron core segment (8); wherein a rotation difference of positions between said axial slots of said first iron core segment (6) and said axial slots of said third iron core segment (8) along said circumferential direction is equal to half of a pitch $\tau_p/2$, where a pitch $\tau_p$ of said rotor teeth (5) is defined as a distance between two tooth which are aligned along said circumferential direction; wherein said 2n number of permanent magnets (3) utilizes permanent magnet having a tile-shaped structure which is radially magnetized or magnetized in parallel; wherein said 2n number of permanent magnets (3) are divided equally into 2 groups to define a first permanent magnet group and a second permanent magnet group; wherein each of said permanent magnets of said first permanent magnet group are secured into position at one of said axial slot of said first iron core segment (6); wherein each of said permanent magnets of said second permanent magnet group are secured into position at one of said axial slots of said third iron core segment (8); wherein a magnetization direction of each of said permanent magnets which are positioned in said first iron core segment (6) are the same, and said magnetization direction of said permanent magnets in said first iron core segment (6) is pointing to or away from said center; wherein a magnetization direction of each of said plurality of permanent magnets in said third iron core segment (8) are the same, and said magnetization direction of said permanent magnets in said third iron core segment (8) is pointing to or away from said center; wherein said permanent magnets in said first iron core segment (6) and said permanent magnets in said third iron core segment (8) are arranged in the same polarities; wherein a polar distance $\tau_m$ is defined as a distance between each two adjacently positioned permanent magnets in said same iron core segment in which said permanent magnets are aligned along said circumferential direction of said corresponding iron core segment, and a relation between said polar distance and said pitch fulfills the equation $\tau_m = \tau_p$.

8. The multi-phase reluctance electric motor with transverse magnetic flux according to claim 7, characterized in that, wherein said rotor teeth (5) have a high magnetic permeability.

9. The multi-phase reluctance electric motor with transverse magnetic flux according to claim 7, characterized in that, wherein said first iron core segment (6), said second iron core segment (7) and said third iron core segment (8) are integral in structure or non-integral in structure.

10. A multi-phase reluctance electric motor with transverse magnetic flux, characterized in that: said electric motor comprises a stator (10) and a rotor (20); wherein a gas partition channel (30) is defined between said stator (10) and said rotor (20); wherein said rotor (20) comprises a rotor frame unit (4) and a plurality of rotor teeth (5); wherein said plurality of rotor teeth (5) are uniformly distributed along said outer circumferential portion of said rotor frame unit (4); wherein said rotor frame unit (4) and said rotor teeth (5) have an integrated structure; wherein said stator (10) comprises a housing (1) and an armature unit with m number of phases defining m number of single-phase armature members, where m is said number of phases of said electric motor and m is equal to or greater than 3; wherein said housing (1) has a cylindrical structure; wherein said m number of armature members of said armature unit are sequentially arranged along an axial direction inside said housing, and said single-phase armature members are sequentially staggered along an circumferential direction at an electrical angle of 360°/m; wherein each of said single-phase armature member comprises an armature iron core, an armature coil (2) and 2n number of permanent magnets (3); wherein n is a positive integer; wherein each of said armature iron cores comprises n number of iron core poles and each one of said iron core poles comprises one first iron core segment (6), one second iron core segment (7) and one third iron core segment (8) fittingly arranged together, while n number of axial slots are uniformly provided along said circumferential direction at an inner surface of said housing (1) and each of said axial slots has a bottom portion having an arc-shaped structure and two side panels which are parallel to each other; wherein said number of axial slots is the same as said number of iron core poles of said armature iron core in the same armature iron core, said n number of iron core poles of each of said armature iron core are sequentially positioned in said axial slots along said circumferential direction respectively, and each of said iron core pole are fittingly in direct contact with said bottom portion and said two side panels of said axial slot corresponding to said particular iron core pole; wherein a height of said first iron core segment (6) along a radial direction is the same as a height of said third iron core segment (8) along said radial direction, a height of said second iron core segment (7) along said radial direction is smaller than said height of said first iron core segment (6) along said radial direction, each of said iron core poles define one gas partition side panel adjacent to said gas partition channel (30) and has one winding groove provided on said gas partition side panel, and all of said winding grooves of said n number of iron core poles of said same armature iron core have the same axial position; wherein said armature coil (2) is an annular armature coil and said armature coil (2) is embedded in said winding grooves of said n number of iron core poles of said armature iron core corresponding to said same armature iron core; wherein said 2n number of permanent magnets (3) utilizes radially magnetized or magnetized in parallel tile-shaped permanent magnet; wherein said 2n number of permanent magnets (3) are positioned at an inner surface of said first iron core segment (6) and at an inner surface of said third iron core segment (8) of said n number of iron core poles respectively; wherein each of said two adjacently positioned permanent magnets (3) belonging to said same particular iron core pole are arranged in opposite polarities and each of said two adjacently positioned permanent magnets (3) along said circumferential direction are also arranged in opposite polarities; wherein a polar distance $\tau_m$ is defined as a distance between said two adjacently positioned permanent magnets aligned along said circumferential direction, where a pitch $\tau_p$ is defined as a distance between two tooth of said rotor teeth (5) which are aligned along said circumferential direction, and a relation between said polar distance and said pitch fulfills the equation $2\tau_m = \tau_p$.

11. The multi-phase reluctance electric motor with transverse magnetic flux according to claim 10, characterized in that, wherein said rotor teeth (5) have a high magnetic permeability.

12. The multi-phase reluctance electric motor with transverse magnetic flux according to claim 10, characterized in that, wherein said first iron core segment (6), said second iron core segment (7) and said third iron core segment (8) are integral in structure or non-integral in structure.

13. A multi-phase reluctance electric motor with transverse magnetic flux, characterized in that: said electric motor comprises a stator (10) and a rotor (20); wherein a gas partition channel (30) is defined between said stator (10) and said rotor (20); wherein said rotor (20) comprises a rotor frame unit (4) and a plurality of rotor teeth (5); wherein said plurality of rotor teeth (5) are uniformly distributed along said outer circumferential portion of said rotor frame unit (4); wherein said rotor frame unit (4) and said rotor teeth (5) have an integrated structure; wherein said stator (10) comprises a housing (1) and an armature unit with m number of phases defining m number of single-phase armature members, where m is said number of phases of said electric motor and m is equal to or greater than 3; wherein said housing (1) has a cylindrical structure; wherein said m number of armature members of said armature unit are sequentially arranged along an axial direction inside said housing, and said single-phase armature members are sequentially staggered along an circumferential direction at an electrical angle of 360°/m; wherein each of said single-phase armature member comprises an armature iron core, an armature coil (2) and 2n number of permanent magnets (3); wherein n is an even number; wherein said armature iron core comprises a first iron core segment (6), a second iron core segment (7) and a third iron core segment (8), all of said first, said second and said third iron core segments have a ring-shaped structure, each of which defines a central axis, an outer diameter and an inner diameter respectively, said first, said second and said third iron core segments are sequentially and tightly arranged along an axial direction inside said housing (1), said central axis of said first, said second and said third iron core segments is the same, said outer diameter of said first, said second and said third segments is the same, said second iron core segment (7) is positioned between said first iron core segment (6) and said third iron core segment (8), said inner diameter of said second iron core segment (7) is greater than said inner diameter of said first iron core segment (7), and said inner diameter of said first iron core segment (6) and said inner diameter of said third iron core segment (8) are the same; wherein said armature coil (2) is an annular armature coil and said armature coil (2) is embedded within an annular space formed between said first iron core segment (6), said second iron core segment (7) and said third iron core segment (8); wherein each of said 2n number of permanent magnets (3) has a flat-shaped structure and is tangentially magnetized; wherein said 2n number of permanent magnets (3) are divided equally into 2 groups to define a first permanent magnet group and a second permanent magnet group; wherein said n number of permanent magnets (3) of said first permanent magnet group are uniformly embedded inside said first iron core segment (6) of said armature iron core along said circumferential direction and are aligned to forming a first radial alignment pattern along said radial direction; wherein said n number of permanent magnets (3) of said second permanent magnet group are uniformly embedded inside said third iron core segment (8) of said armature iron core along said circumferential direction and are aligned to forming a second radial alignment pattern along said radial direction, while each of said permanent magnets (3) are fittingly in direct contact with said housing (1); wherein a length of each of said permanent magnets (3) of said first iron core segment (6) and a length of each of said permanent magnets (3) of said third iron core segment (8) along said axial direction are the same; said first iron core segment (6) embedded with said permanent magnets (3) and said third iron core segment (8) embedded with said permanent magnets (3) have said same structural construction in which each of said two adjacently positioned permanent magnets (3) along said circumferential direction are arranged in opposite polarities and each of said two adjacently positioned permanent magnets (3) along said axial direction are arranged in opposite polarities; wherein a polar distance $\tau_m$ is defined as a distance between said two adjacently positioned permanent magnets aligned along said circumferential direction, where a pitch $\tau_p$ is defined as a distance between two tooth of said rotor teeth (5) which are aligned along said circumferential direction, and a relation between said polar distance and said pitch fulfills the equation $2\tau_m=\tau_p$.

14. The multi-phase reluctance electric motor with transverse magnetic flux according to claim 13, characterized in that, wherein a thickness of each of the permanent magnets defined along the tangential direction of a side of the housing is greater than or equal to a thickness of the permanent magnets (3) defined at the gas partition side panel along the tangential direction.

15. The multi-phase reluctance electric motor with transverse magnetic flux according to claim 13, characterized in that, wherein said rotor teeth (5) have a high magnetic permeability.

16. The multi-phase reluctance electric motor with transverse magnetic flux according to claim 13, characterized in that, wherein said first iron core segment (6), said second iron core segment (7) and said third iron core segment (8) are integral in structure or non-integral in structure.

17. A multi-phase reluctance electric motor with transverse magnetic flux, characterized in that: said electric motor comprises a stator (10) and a rotor (20); wherein a gas partition channel (30) is defined between said stator (10) and said rotor (20); wherein said rotor (20) comprises a rotor frame unit (4) and a plurality of rotor teeth (5); wherein said plurality of rotor teeth (5) are uniformly distributed along said outer circumferential portion of said rotor frame unit (4); wherein said rotor frame unit (4) and said rotor teeth (5) have an integrated structure; wherein said stator (10) comprises a housing (1) and an armature unit with m number of phases defining m number of single-phase armature members, where m is said number of phases of said electric motor and m is equal to or greater than 3; wherein said housing (1) has a cylindrical structure; wherein said m number of armature members of said armature unit are sequentially arranged along an axial direction inside said housing, and said single-phase armature members are sequentially staggered along an circumferential direction at an electrical angle of 360°/m; wherein each of said single-phase armature member comprises an armature iron core, an armature coil (2) and a plurality number of permanent magnets (3); wherein each of said armature iron cores comprises a plurality number of iron core poles in which each one of said iron core poles comprises one first iron core segment (6), one second iron core segment (7) and one third iron core segment (8) fittingly arranged together, while a plurality number of axial slots which have said same structural construction are uniformly provided along said circumferential direction at an inner surface of said housing (1) and are aligned to form a radial pattern along said radial direction, and each of said axial slots has a bottom portion having an arc-shaped structure and two side panels extended from two sides of said bottom portion; wherein said number of axial slots is said same as said number of iron core poles of said armature iron core belonging to said same armature iron core; wherein each of said iron core poles of each one of said armature iron core is fittingly positioned in one of said axial slots, and each of said iron core poles is fittingly in direct contact with said bottom portion and said two side panels of said axial slot receiving said particular iron core pole; wherein said second iron core segment (7) is positioned between said first iron core segment (6) and said third iron core segment (8), a height of said first iron core segment (6) along said radial direction is said same as a height of said third iron core segment (8) along said radial direction, a height of said second iron core segment (7) along said radial direction is smaller than said height of said first iron core segment (6) along said radial direction, each of said iron core poles defines one gas partition side panel adjacent to said gas partition channel (30) and has one winding groove provided on said gas partition side panel, and all of said winding grooves of each of said iron core poles of said same armature iron core has said same axial position; wherein said armature coil (2) is an annular armature coil and said armature coil (2) is embedded in said winding grooves of said iron core poles of said armature iron core corresponding to said same armature iron core; wherein each of said plurality number of permanent magnet (3) has a flat-shaped structure and is tangentially magnetized; wherein along said circumferential direction, one piece of permanent magnet (3) is embedded into said center of said first iron core segment (6) of each of said iron core pole, and one piece of permanent magnet (3) is embedded into said center of said third iron core segment (8) of each of said iron core pole; wherein each of said two adjacently positioned permanent magnets (3) along said circumferential direction are arranged in opposite polarities and each of said two adjacently positioned permanent magnets (3) along said axial direction are arranged in opposite polarities; wherein a polar distance $\tau_m$ is defined as a distance between said two adjacently positioned permanent magnets aligned along said circumferential direction, where a pitch $\tau_p$ is defined as a distance between two tooth of said rotor teeth (5) which are aligned along said circumferential direction, and a relation between said polar distance and said pitch fulfills the equation $2\tau_m=\tau_p$.

18. The multi-phase reluctance electric motor with transverse magnetic flux according to claim 17, characterized in that, wherein said rotor teeth (5) have a high magnetic permeability.

19. The multi-phase reluctance electric motor with transverse magnetic flux according to claim 17, characterized in that, wherein said first iron core segment (6), said second iron core segment (7) and said third iron core segment (8) are integral in structure or non-integral in structure.

20. The multi-phase reluctance electric motor with transverse magnetic flux according to claim 17, characterized in that, wherein a thickness of each of the permanent magnets defined along the tangential direction of a side of the housing is greater than or equal to a thickness of the permanent magnets (3) defined at the gas partition side panel along the tangential direction.

* * * * *